United States Patent
Pillai

(10) Patent No.: US 7,538,720 B2
(45) Date of Patent: May 26, 2009

(54) SIMULTANEOUS SAVINGS IN BANDWIDTH AND ENERGY USING WAVEFORM DESIGN IN PRESENCE OF INTERFERENCE AND NOISE

(75) Inventor: Unnikrishna Sreedharan Pillai, Harrington Park, NJ (US)

(73) Assignee: C & P Technologies, Inc., Closter, NJ (US)

( * ) Notice: Subject to any disclaimer, the term of this patent is extended or adjusted under 35 U.S.C. 154(b) by 0 days.

(21) Appl. No.: 11/747,365

(22) Filed: May 11, 2007

(65) Prior Publication Data
US 2008/0169971 A1    Jul. 17, 2008

Related U.S. Application Data

(63) Continuation-in-part of application No. 11/623,965, filed on Jan. 17, 2007.

(51) Int. Cl.
*G01S 7/28* (2006.01)
*G01S 7/35* (2006.01)
*G01S 13/02* (2006.01)
*G01S 13/00* (2006.01)
*G01S 7/00* (2006.01)

(52) U.S. Cl. ............ 342/196; 367/87; 342/82; 342/89; 342/159; 342/175; 342/195; 375/316; 375/346; 375/350

(58) Field of Classification Search .......... 342/27, 342/28, 82, 89–103, 118, 128–133, 159–165, 342/173, 175, 192–197, 200–205; 367/87–105, 367/117; 375/229–236, 316, 346, 347–352
See application file for complete search history.

(56) References Cited

U.S. PATENT DOCUMENTS

| 4,408,332 | A | * | 10/1983 | Sari | 375/232 |
| 4,901,082 | A | * | 2/1990 | Schreiber et al. | 342/89 |
| 5,121,125 | A | * | 6/1992 | Guerci et al. | 342/204 |
| 5,146,229 | A | * | 9/1992 | Guerci et al. | 342/204 |
| 5,175,552 | A | * | 12/1992 | Grieve et al. | 342/82 |
| 5,381,154 | A | * | 1/1995 | Guerci | 342/90 |

(Continued)

OTHER PUBLICATIONS

"Optimum Signals in Noise and Reverberation", Author Theo Kooij, Saclant ASW Research Centre, Le Spezia, Italy, presented at "Nato Advanced Study Institute on Signal Processing with Emphasis on Underwater Acoustics", Enschede, the Netherlands, Aug. 23, 1968.

(Continued)

*Primary Examiner*—Bernarr E Gregory
(74) *Attorney, Agent, or Firm*—Walter J. Tencza, Jr.

(57) ABSTRACT

A transmit signal is output from a transmitter towards a target and towards interference. A combination signal is received at a receiver, wherein the combination signal includes the transmit signal modified by interacting with the target and the interference along with noise. The receiver has a filter having a transfer function and the filter acts on the combination signal to form a receiver output signal having a receiver output signal waveform. The receiver output signal has a receiver output signal waveform that describes an output signal to interference to noise ratio (SINR) performance. Bandwidth and signal energy of the transmit signal are reduced simultaneously by modifying the transmit signal waveform and receiver output signal waveforms without sacrificing the output SINR performance level.

22 Claims, 13 Drawing Sheets

U.S. PATENT DOCUMENTS

| | | | |
|---|---|---|---|
| 6,822,606 B2 * | 11/2004 | Ponsford et al. | 342/192 |
| 6,864,834 B2 * | 3/2005 | Walton | 342/195 |
| 6,999,025 B2 * | 2/2006 | Poullin | 342/159 |
| 7,038,616 B2 * | 5/2006 | Pillai | 342/90 |
| 7,196,657 B2 * | 3/2007 | Walton | 342/195 |
| 2004/0150555 A1 * | 8/2004 | Walton | 342/195 |
| 2004/0178951 A1 * | 9/2004 | Ponsford et al. | 342/192 |
| 2004/0257270 A1 * | 12/2004 | Poullin | 342/159 |
| 2005/0134500 A1 * | 6/2005 | Pillai | 342/90 |
| 2006/0012513 A1 * | 1/2006 | Walton | 342/195 |

OTHER PUBLICATIONS

"Energy Threshold Constraints in Transmit Waveform Design", Presented at the "Waveform Diversity and Design Conference," Kauai, Hawaii, Jan. 22-27, 2006, S. Unnikrishna Pillai, Ke Yong Li, Braham Himed.

"Image Restoration by the Method of Generalized Projections with Application to Restoration from Magnitude" Aharon Levi and Henry Stark, Department of Electrical, Computer, and Systems Engineering, Rensselaer Polytechnic Institute, Troy, New York 12181 CH1945-5184l0000-0404 $1.00 © 1984 IEEE.

"Image Recovery: Theory and Application", Chapter 2, "Mathematical Theory of Image Restoration by the Method of Convex Projection", D.C. Youla, Department of Electrical Engineering and Computer Science, Polytechnic University, Farmingdale, New York, 11735.

* cited by examiner

SIMULTANEOUS SAVINGS IN BANDWIDTH AND ENERGY USING WAVEFORM DESIGN IN PRESENCE OF INTERFERENCE AND NOISE

CROSS REFERENCE TO RELATED APPLICATION(S)

The present application is a continuation in part of and claims the priority of U.S. patent application Ser. No. 11/623,965, titled "APPARATUS AND METHOD FOR PROVIDING ENERGY-BANDWIDTH TRADEOFF AND WAVEFORM DESIGN IN INTERFERENCE AND NOISE", filed on Jan. 17, 2007, inventor UNNIKRISHNA SREEDHARAN PILLAI.

STATEMENT REGARDING FEDERALLY SPONSORED RESEARCH OR DEVELOPMENT

The present invention is based upon work supported and/or sponsored by the Air Force Research Laboratory (AFRL), Rome, N.Y., under contract No. FA8750-06-C-0202.

FIELD OF INVENTION

The invention relates to techniques concerning transmitter-receiver waveform design methods that are applicable to radar, sonar and wireless communications.

BACKGROUND OF INVENTION

In the general problem, a desired target is buried in both interference and noise. A transmit signal excites both the desired target and the interference simultaneously. The interference and/or interferences can be foliage returns in the form of clutter for radar, scattered returns of the transmit signal from a sea-bottom and different ocean-layers in the case of sonar, or multipath returns in a communication scene. In all of these cases, like the target return, the interference returns are also transmit signal dependent, and hence it puts conflicting demands on the receiver. In general, the receiver input is comprised of target returns, interferences and the ever present noise. The goal of the receiver is to enhance the target returns and simultaneously suppress both the interference and noise signals. In a detection environment, a decision regarding the presence or absence of a target is made at some specified instant $t=t_o$ using output data from a receiver, and hence to maximize detection, the Signal power to average Interference plus Noise Ratio (SINR) at the receiver output can be used as an optimization goal. This scheme is illustrated in FIG. 1.

The transmitter output bandwidth can be controlled using a known transmitter output filter having a transfer function $P_1(\omega)$ (see FIG. 2A). A similar filter with transform characteristics $P_2(\omega)$ can be used at a receiver input 22a shown in FIG. 1, to control the processing bandwidth as well.

The transmit waveform set f(t) at an output 10a of FIG. 1, can have spatial and temporal components to it each designated for a specific goal. The simplest situation is that shown in FIG. 2A where a finite duration waveform f(t) of energy E is to be designed. Thus $$\int_0^{T_o} |f(t)|^2 \, dt = E. \tag{1}$$

Usually, transmitter output filter 12 characteristics $P_1(\omega)$, such as shown in FIG. 2B, are known and for design purposes, it is best to incorporate the transmitter output filter 12 and the receiver input filter (which may be part of receiver 22) along with the target and clutter spectral characteristics.

Let $q(t) \leftrightarrow Q(\omega)$ represent the target impulse response and its transform. In general q(t) can be any arbitrary waveform. Thus the modified target that accounts for the target output filter has transform $P_1(\omega)Q(\omega)$ etc. In a linear domain setup, the transmit signal f(t) interacts with the target q(t), or target 14 shown in FIG. 1, to generate the output below (referred to in S. U. Pillai, H. S. Oh, D. C. Youla, and J. R. Guerci, "Optimum Transmit-Receiver Design in the Presence of Signal-Dependent Interference and Channel Noise", IEEE Transactions on Information Theory, Vol. 46, No. 2, pp. 577-584, March 2000 and J. R. Guerci and S. U. Pillai, "Theory and Application of Optimum Transmit-Receive Radar," IEEE International Radar Conference, Alexandria Va., May 2000, pp. 705-710.):

$$s(t) = f(t) * q(t) = \int_0^{T_o} f(\tau) q(t - \tau) \, d\tau \tag{2}$$

that represents the desired signal.

The interference returns are usually due to the random scattered returns of the transmit signal from the environment, and hence can be modeled as a stochastic signal $w_c(t)$ that is excited by the transmit signal f(t). If the environment returns are stationary, then the interference can be represented by its power spectrum $G_c(\omega)$. This gives the average interference power to be $G_c(\omega)|F(\omega)|^2$. Finally let n(t) represent the receiver 22 input noise with power spectral density $G_n(\omega)$. Thus the receiver input signal at input 22a equals $$r(t)=s(t)+w_c(t)*f(t)+n(t), \tag{3}$$

and the input interference plus noise power spectrum equals $$G_I(\omega)=G_c(\omega)|F(\omega)|^2+G_n(\omega). \tag{4}$$

The received signal is presented to the receiver 22 at input 22a with impulse response h(t). The simplest receiver is of the noncausal type.

With no restrictions on the receiver 22 of FIG. 1, its output signal at output 22b in FIG. 1, and interference noise components are given by $$y_S(t) = s(t) * h(t) = \frac{1}{2\pi} \int_{-\infty}^{+\infty} S(\omega) H(\omega) e^{j\omega t} \, d\omega \tag{5}$$

and $$y_n(t) = \{w_c(t) * f(t) + n(t)\} * h(t). \tag{6}$$

The output $y_n(t)$ represents a second order stationary stochastic process with power spectrum below (referred to in the previous publications and in Athanasios Papoulis, S. Unnikrishna Pillai, Probability, Random Variables and Stochastic Processes, McGraw-Hill Higher Education, New York 2002):

$$G_o(\omega)=(G_c(\omega)|F(\omega)|^2+G_n(\omega))|H(\omega)|^2 \tag{7}$$

and hence the total output interference plus noise power is given by $$\sigma_{I+N}^2 = \frac{1}{2\pi} \int_{-\infty}^{+\infty} G_O(\omega) \, d\omega \tag{8}$$

$$= \frac{1}{2\pi} \int_{-\infty}^{+\infty} (G_c(\omega)|F(\omega)|^2 + G_n(\omega))|H(\omega)|^2 \, d\omega.$$

Referring back to FIG. 1, the signal component $y_s(t)$ in equation (5) at the receiver output 22*b* needs to be maximized at the decision instant $t_o$ in presence of the above interference and noise. Hence the instantaneous output signal power at $t=t_o$ is given by the formula below shown in S. U. Pillai, H. S. Oh, D. C. Youla, and J. R. Guerci, "Optimum Transmit-Receiver Design in the Presence of Signal-Dependent Interference and Channel Noise", IEEE Transactions on Information Theory, Vol. 46, No. 2, pp. 577-584, March 2000, which is incorporated by reference herein:

$$P_O = |y_S(t_O)|^2 = \left| \frac{1}{2\pi} \int_{-\infty}^{+\infty} S(\omega) H(\omega) e^{j\omega t_o} d\omega \right|^2. \quad (9)$$

This gives the receiver output SINR at $t=t_o$ be the following as specified in Guerci et. al., "Theory and Application of Optimum Transmit-Receive Radar", pp. 705-710; and Pillai et. al., "Optimum Transmit-Receiver Design in the Presence of Signal-Dependent Interference and Channel Noise", incorporated herein by reference:

$$SINR = \frac{P_O}{\sigma_{I+N}^2} = \frac{\left| \frac{1}{2\pi} \int_{-\infty}^{+\infty} S(\omega) H(\omega) e^{j\omega t_o} d\omega \right|^2}{\frac{1}{2\pi} \int_{-\infty}^{+\infty} G_I(\omega) |H(\omega)|^2 d\omega}. \quad (10)$$

We can apply Cauchy-Schwarz inequality in equation (10) to eliminate $H(\omega)$. This gives $$SINR \leq \frac{1}{2\pi} \int_{-\infty}^{+\infty} \frac{|S(\omega)|^2}{G_I(\omega)} d\omega = \quad (11)$$

$$\frac{1}{2\pi} \int_{-\infty}^{+\infty} \frac{|Q(\omega)|^2 |F(\omega)|^2}{G_c(\omega) |F(\omega)|^2 + G_n(\omega)} d\omega = SINR_{max}.$$

Thus the maximum obtainable SINR is given by equation (11), and this is achieved if and only if the following equation referred to in previous prior art publications, is true:

$$H_{opt}(\omega) = \frac{S^*(\omega)}{G_c(\omega)|F(\omega)|^2 + G_n(\omega)} e^{-j\omega t_o} \quad (12)$$

$$= \frac{Q^*(\omega) F^*(\omega)}{G_c(\omega)|F(\omega)|^2 + G_n(\omega)} e^{-j\omega t_o}.$$

In (12), the phase shift $e^{-j\omega t_o}$ can be retained to approximate causality for the receiver waveform. Interestingly even with a point target ($Q\omega \equiv 1$), flat noise ($G_n(\omega) = \sigma_n^2$), and flat clutter ($G_c(\omega) = \sigma_c^2$), the optimum receiver is not conjugate-matched to the transmit signal, since in that case from equation (12) we have the following formula given by Pillai et. al., "Optimum Transmit-Receiver Design in the Presence of Signal-Dependent Interference and Channel Noise", incorporated herein by reference, Papoulis, "Probability, Random Variables and Stochastic Processes", and H. L. Van Trees, Detection, Estimation, and Modulation Theory, Part I, New York: John Wiley and Sons, 1968, incorporated by reference:

$$H_{opt}(\omega) = \frac{F^*(\omega)}{\sigma_c^2 |F(\omega)|^2 + \sigma_n^2} e^{-j\omega t_o} \neq F^*(\omega) e^{-j\omega t_o}. \quad (13)$$

Prior Art Transmitter Waveform Design

When the receiver design satisfies equation (12), the output SINR is given by the right side of the equation (11), where the free parameter $|F(\omega)|^2$ can be chosen to further maximize the output SINR, subject to the transmit energy constraint in (1). Thus the transmit signal design reduces to the following optimization problem:

Maximize $$SINR_{max} = \frac{1}{2\pi} \int_{-\infty}^{+\infty} \frac{|Q(\omega)|^2 |F(\omega)|^2}{G_c(\omega)|F(\omega)|^2 + G_n(\omega)} d\omega, \quad (14)$$

subject to the energy constraint $$\int_0^{T_o} |f(t)|^2 dt = \frac{1}{2\pi} \int_{-\infty}^{+\infty} |F(\omega)|^2 d\omega = E. \quad (15)$$

To solve this new constrained optimization problem, combine (14)-(15) to define the modified Lagrange optimization function (referred to in T. Kooij, "Optimum Signal in Noise and Reverberation", *Proceeding of the NATO Advanced Study Institute on Signal Processing with Emphasis on Underwater Acoustics*, Vol. I, Enschede, The Netherlands, 1968.)

$$\Lambda = \int_{-\infty}^{+\infty} \left\{ \frac{|Q(\omega)|^2 y^2(\omega)}{G_c(\omega) y^2(\omega) + G_n(\omega)} - \frac{1}{\lambda^2} y^2(\omega) \right\} d\omega \quad (16)$$

where $$y(\omega) = |F(\omega)| \quad (17)$$

is the free design parameter. From (16) (17), $$\frac{\partial \Lambda}{\partial y} = 0$$

gives $$\frac{\partial \Lambda(\omega)}{\partial y} = 2y(\omega) \left\{ \frac{G_n(\omega)|Q(\omega)|^2}{\{G_c(\omega) y^2(\omega) + G_n(\omega)\}^2} - \frac{1}{\lambda^2} \right\} = 0. \quad (18)$$

where $\Lambda(\omega)$ represents the quantity within the integral in (16). From (18), either $$y(\omega) = 0 \quad (19)$$

or

-continued $$\frac{G_n(\omega)|Q(\omega)|^2}{\{G_c(\omega)y^2(\omega)+G_n(\omega)\}^2} - \frac{1}{\lambda^2} = 0, \quad (20)$$

which gives $$y^2(\omega) = \frac{\sqrt{G_n(\omega)}\left(\lambda|Q(\omega)| - \sqrt{G_n(\omega)}\right)}{G_c(\omega)} \quad (21)$$

provided $y^2(\omega)>0$. See T. Kooij cited above incorporated by reference herein.

SUMMARY OF THE INVENTION

One or more embodiments of the present invention provide a method and an apparatus for transmitter-receiver design that enhances the desired signal output from the receiver while minimizing the total interference and noise output at the desired decision making instant. Further the method and apparatus of an embodiment of the present invention can be used for transmit signal energy-bandwidth tradeoff. As a result, transmit signal energy can be used to tradeoff for "premium" signal bandwidth without sacrificing performance level in terms of the output Signal to Interference plus Noise power Ratio (SINR). The two designs—before and after the tradeoff—will result in two different transmitter-receiver pairs that have the same performance level. Thus a design that uses a certain energy and bandwidth can be traded off with a new design that uses more energy and lesser bandwidth compared to the old design. In many applications such as in telecommunications, since the available bandwidth is at premium, such a tradeoff will result in releasing otherwise unavailable bandwidth at the expense of additional signal energy. The bandwidth so released can be used for other applications or to add additional telecommunications capacity.

In addition, a new method for transmitter-receiver design that can be used for simultaneous savings of transmit signal energy and bandwidth compared to any prior art waveform without sacrificing the performance level is described here. Thus, simultaneous savings in transmit signal energy as well as the more "premium" signal bandwidth, compared to prior art transmit waveforms, can be realized without sacrificing the system performance level in terms of the output Signal to Interference plus Noise power Ratio (SINR). The new design procedure in fact leads to various new transmitter-receiver waveform designs that trade off bandwidth and energy for the same performance level.

DETAILED DESCRIPTION OF THE DRAWINGS

Figure 1:
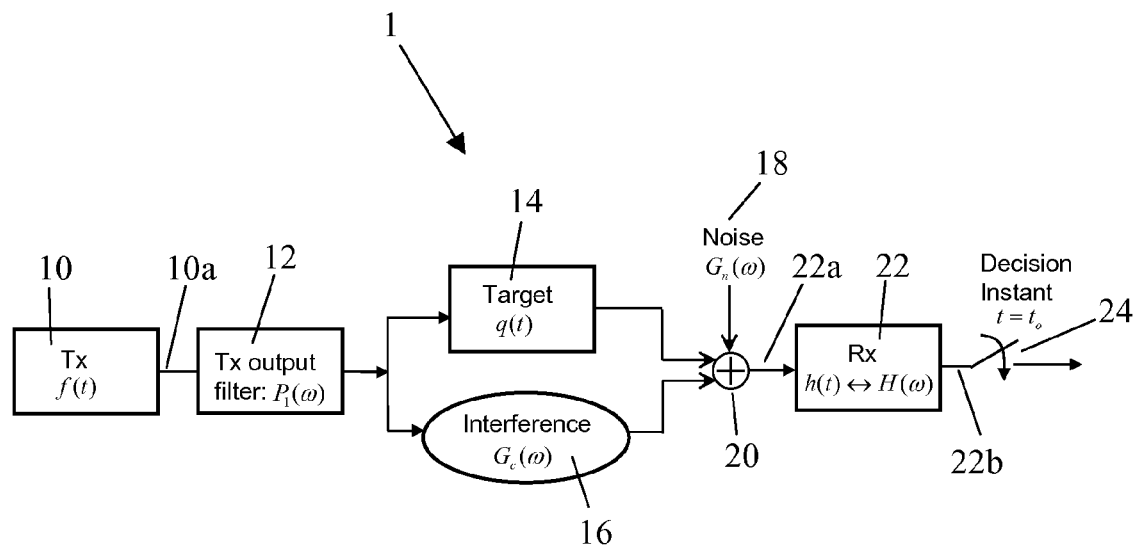
FIG. 1 shows a diagram of a system, apparatus, and/or method including a transmitter, a transmitter output filter, a receiver, a target, interference, noise, and a switch.

FIG. 1 shows a diagram 1 of a system, apparatus, and/or method, including a transmitter 10, a transmitter output filter 12, a target 14, interference 16, noise 18, a summation block 20, receiver 22, and a switch 24. The present invention, in one or more embodiments, provides a new method and apparatus, by selecting a particular transmit signal f(t), to be output from transmitter 10, and a type of receiver or receiver transfer function for receiver 22 in accordance with criteria to be discussed below.

The transmitter 10 transmits an output signal f(t) at its output 10a and supplies this signal to the transmitter output filter 12. As remarked earlier, for design purposes, the transmitter output filter 12 can be lumped together with the target transfer function ?? as well as the interference spectrum. The transmit signal f(t) passes through the airwaves and interacts with a target 14 and interference 16. The target-modified as well as the clutter -modified (or interference modified) versions of the transmit signal f(t) are supplied to the summation block 18 along with receiver noise 18. The summation block 18 may simply be used for description purposes to indicate that the target modified, clutter modified, and noise signals combine together. A combination signal is supplied to receiver 22 at its input 22a. The receiver 22 applies a transfer function $H(\omega)$ (which will be determined and/or selected by criteria of an embodiment of the present invention, to be described below) and a modified combination signal is provided at a receiver output 22b. The output is accessed at time $t=t_0$ by use of switch 24.

Figure 2A:
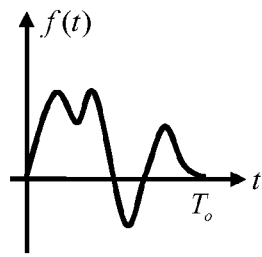
FIG. 2A shows a prior art graph of a prior art transmitter signal versus time, wherein the transmitter signal is output from a transmitter, such as in FIG. 1.

FIG. 2A shows a prior art graph of a prior art transmitter output signal f(t) versus time. The signal used here is arbitrary.

Figure 2B:
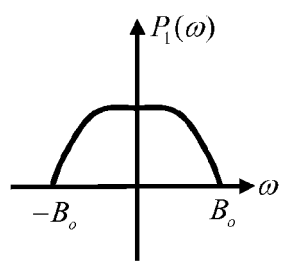
FIG. 2B shows a prior art graph of a possible frequency spectrum of a known transmitter output filter, such as in FIG. 1.

FIG. 2B shows a prior art graph of a frequency spectrum of the transmitter output filter 12 of FIG. 1.

Figure 3A:
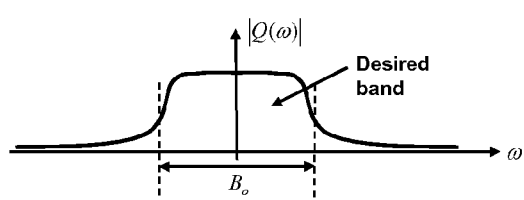
FIG. 3A shows a graph of target transfer function magnitude response versus frequency.

FIG. 3A shows a typical graph of a target transfer function magnitude response for target 14 versus frequency; target as appearing in (14)-(21).

Figure 3B:
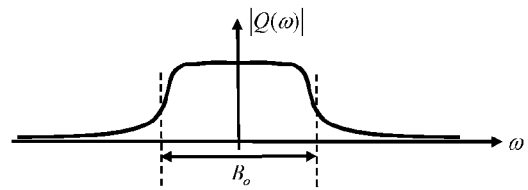
FIG. 3B shows a graph of target transfer function magnitude response versus frequency.

FIG. 3B shows a typical graph of target transfer function magnitude response for target 14 versus frequency; target as appearing in (14)-(21).

Figure 3C:
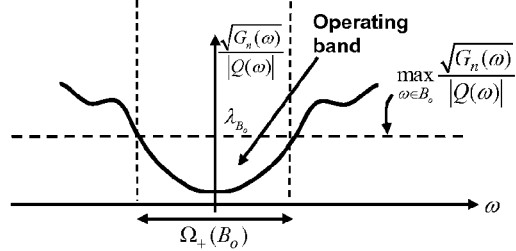
FIG. 3C shows a graph of noise power spectrum divided by target transfer function magnitude response versus frequency.

FIG. 3C shows a graph of noise power spectrum divided by target transfer function magnitude response versus frequency; as in right side of equation (23).

Figure 3D:
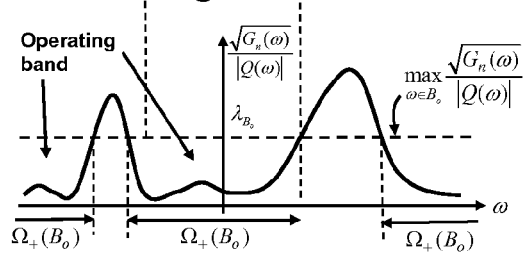
FIG. 3D shows a graph of noise power spectrum divided by target transfer function magnitude response versus frequency.

FIG. 3D shows a graph of noise power spectrum divided by target transfer function magnitude response versus frequency; as in right side of equation (23).

Figure 4A:
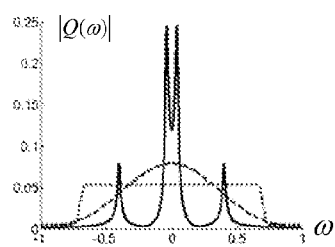
FIG. 4A shows graphs of three different target transfer function magnitude responses versus frequency.

FIG. 4A shows graphs of three different target transfer function magnitude responses versus frequency; target as appearing in (14)-(21).

Figure 4B:
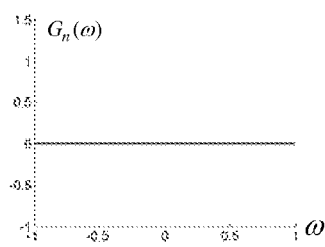
FIG. 4B shows a graph of noise power spectrum versus frequency.

FIG. 4B shows a graph of noise power spectrum versus frequency as appearing in equations (14)-(23).

Figure 4C:
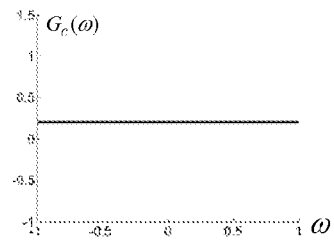
FIG. 4C shows a graph of clutter power spectrum versus frequency.

FIG. 4C shows a graph of clutter power spectrum versus frequency as appearing in equations (14)-(23).

Figure 4D:
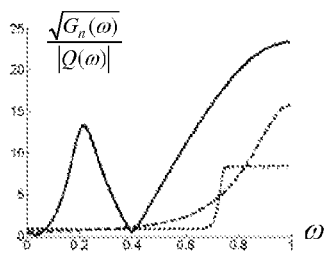
FIG. 4D shows a graph of noise power spectrum divided by target transfer function magnitude response versus frequency.

FIG. 4D shows a graph of noise power spectrum divided by target transfer function magnitude response versus frequency as in right side of equation (23).

Figure 4E:
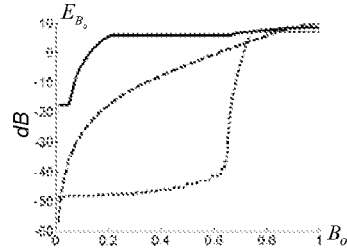
FIG. 4E shows a graph of transmitter threshold energy versus bandwidth.

FIG. 4E shows a graph of transmitter threshold energy versus bandwidth using equation (26).

Figure 4F:
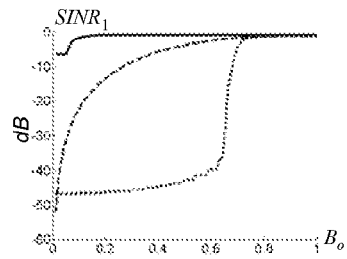
FIG. 4F shows a graph of signal to inference plus noise ratio (SINR) versus bandwidth.

FIG. 4F shows a graph of signal to inference plus noise ratio versus bandwidth using equations (27)-(31).

Figure 5A:
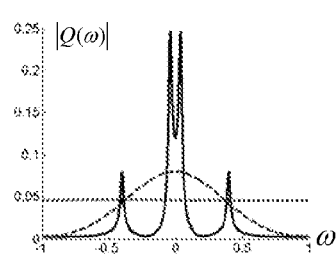
FIG. 5A shows graphs of three different target transfer function magnitude responses versus frequency.

FIG. 5A shows graphs of three different target transfer function magnitude responses versus frequency; target as appearing in (14)-(21).

Figure 5B:
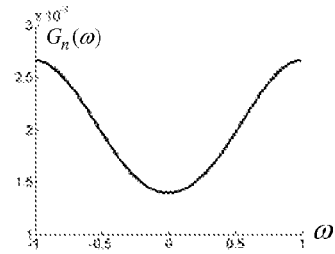
FIG. 5B shows a graph of noise power spectrum versus frequency.

FIG. 5B shows a graph of noise power spectrum versus frequency as appearing in equations (14)-(23).

Figure 5C:
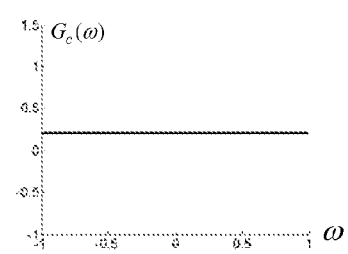
FIG. 5C shows a graph of clutter power spectrum versus frequency.

FIG. 5C shows a graph of clutter power spectrum versus frequency as appearing in equations (14)-(23).

Figure 5D:
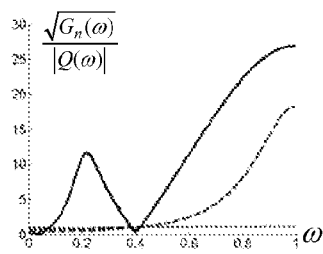
FIG. 5D shows a graph of noise power spectrum divided by target transfer function magnitude response versus frequency.

FIG. 5D shows a graph of noise power spectrum divided by target transfer function magnitude response versus frequency as in right side of equation (23).

Figure 5E:
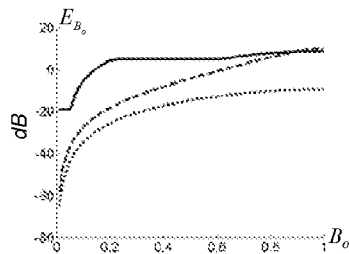
FIG. 5E shows a graph of transmitter threshold energy versus bandwidth.

FIG. 5E shows a graph of transmitter threshold energy versus bandwidth using equation (26).

Figure 5F:
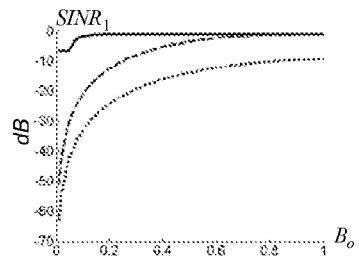
FIG. 5F shows a graph of signal to inference plus noise ratio (SINR) versus bandwidth.

FIG. 5F shows a graph of signal to inference plus noise ratio versus bandwidth using equations (27)-(31).

Figure 6A:
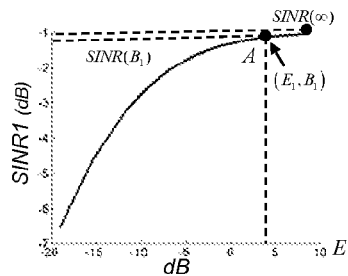
FIG. 6A shows a graph of signal to interference plus noise ratio versus energy for a resonant target shown in FIG. 5A (solid line)

FIG. 6A shows a graph of signal to interference plus noise ratio versus energy for a resonant target shown in FIG. 5A (solid line) using equations (34)-(35).

Figure 6B:
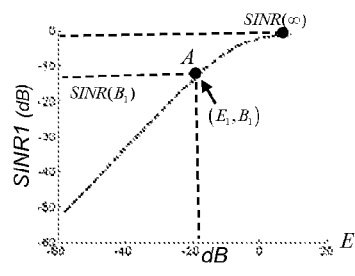
FIG. 6B shows a graph of signal to interference plus noise ratio versus energy for a low pass target shown in FIG. 5A (dashed line)

FIG. 6B shows a graph of signal to interference plus noise ratio versus energy for a low pass target shown in FIG. 5A (dashed line) using equations (34)-(35).

Figure 6C:
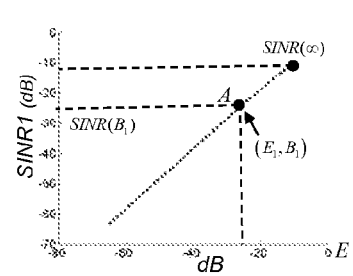
FIG. 6C shows a graph of signal to interference plus noise ratio versus energy for a flat target shown in FIG. 5A (dotted line)

FIG. 6C shows a graph of signal to interference plus noise ratio versus energy for a flat target shown in FIG. 5A (dotted line) using equations (34)-(35).

Figure 7:
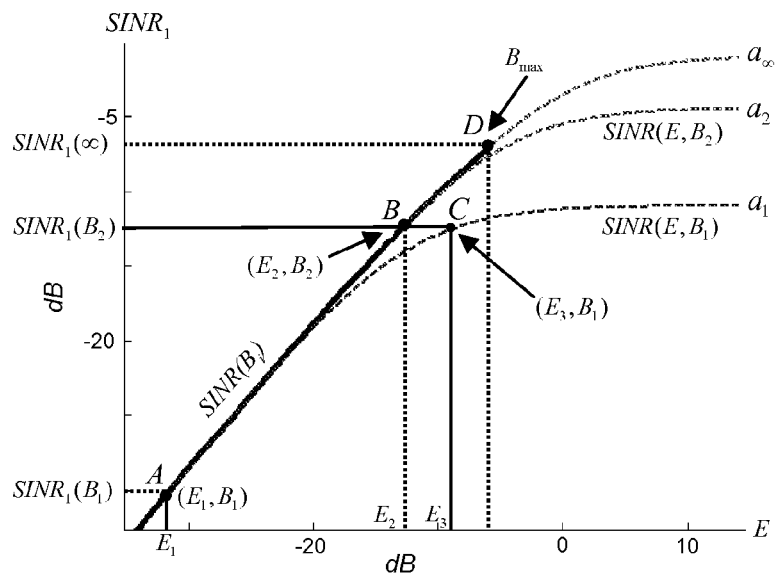
FIG. 7 shows a graph of signal to interference plus noise ratio versus energy and the Bandwidth-Energy swapping design.

FIG. 7 shows a graph of signal to interference plus noise ratio versus energy; generated using equations (39), (48), and (51).

Figure 8A:
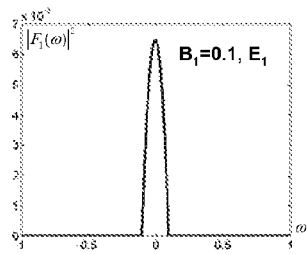
FIG. 8A shows a graph of the transform of the transmitter signal versus frequency corresponding to the design point A in FIG. 7.

FIG. 8A shows a graph of the transform of the transmitter signal versus frequency corresponding to the design point A in FIG. 7 generated using (42).

Figure 8B:
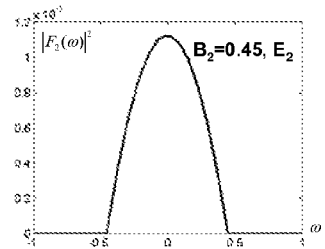
FIG. 8B shows a graph of the transform of the transmitter signal versus frequency corresponding to the design point B in FIG. 7.

FIG. 8B shows a graph of the transform of the transmitter signal versus frequency corresponding to the design point B in FIG. 7 generated using (42).

Figure 8C:
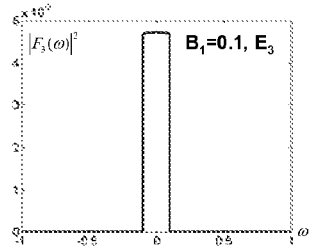
FIG. 8C shows a graph of the transform of the transmitter signal versus frequency corresponding to the design point C in FIG. 7.

FIG. 8C shows a graph of the transform of the transmitter signal versus frequency corresponding to the design point C in FIG. 7 generated using (42) for a third energy condition.

Figure 9:
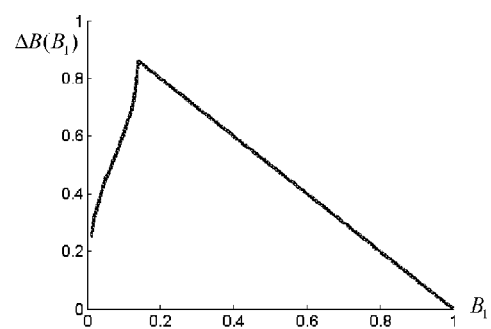
FIG. 9 is a graph of realizable bandwidth savings versus operating bandwidth.

FIG. 9 is a realizable bandwidth savings versus operating bandwidth generated using equation (60).

Figure 10:
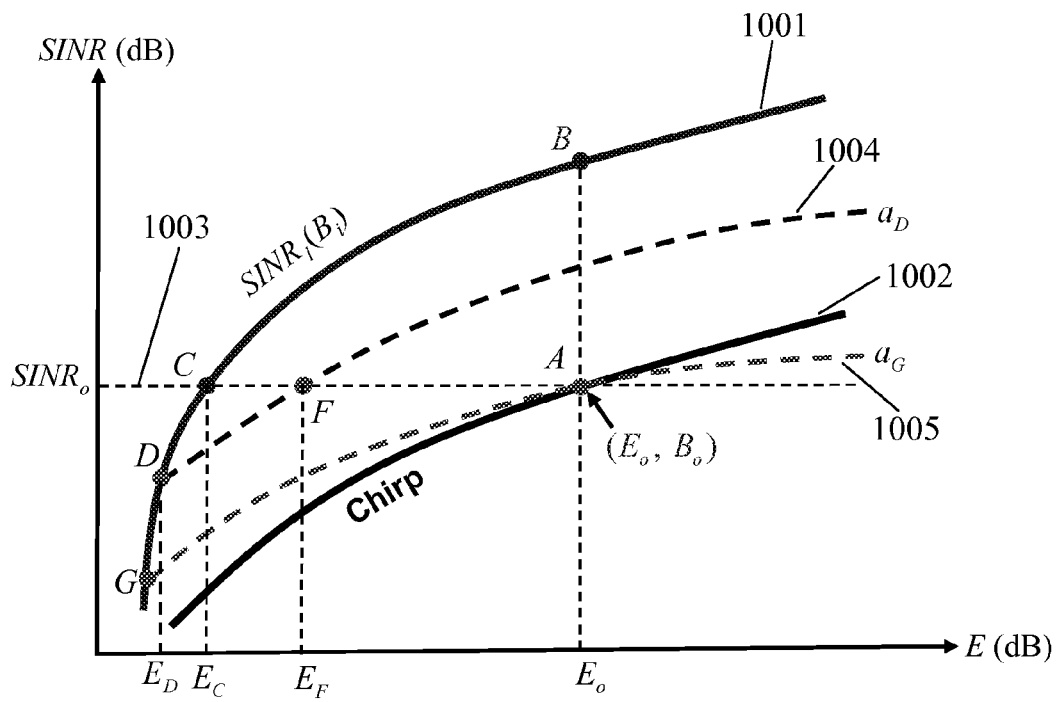
FIG. 10 shows simultaneous energy and bandwidth saving design—graphs of SINR versus energy for optimum waveform and chirp waveform.
Figure 11:
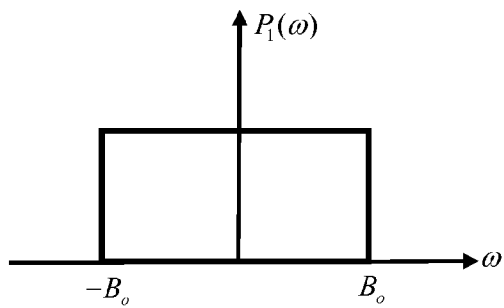
FIG. 11 shows a prior art graph of a possible frequency spectrum of a bandlimiting filter.
Figure 12A:
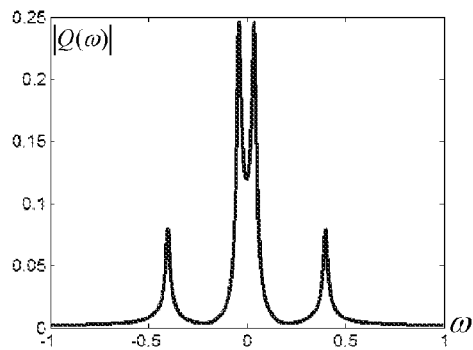
FIG. 12A shows a graph of a target transfer function magnitude responses versus frequency.
Figure 12B:
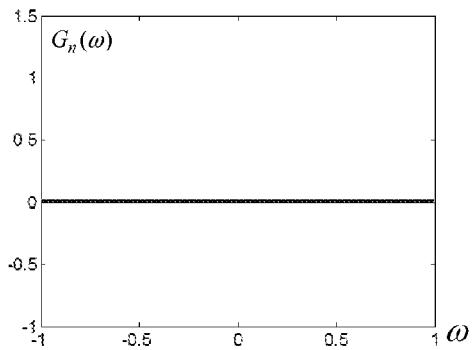
FIG. 12B shows a graph of noise power spectrum versus frequency.
Figure 12C:
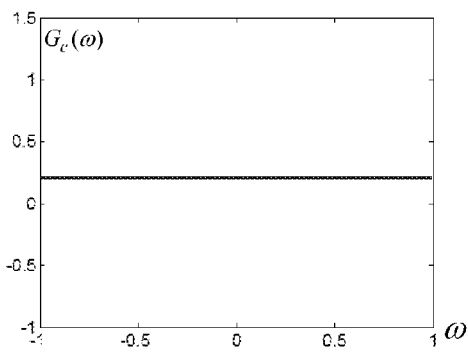
FIG. 12C shows a graph of clutter power spectrum versus frequency.
Figure 12D:
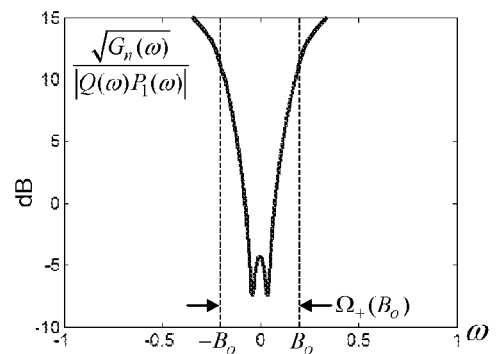
FIG. 12D shows a graph of the square root of the noise power spectrum divided by target transfer function magnitude response that has been modified by the transmitter output filter versus frequency.

FIG. 10 shows a typical graph of simultaneous energy and bandwidth saving design—graphs of SINR versus energy for optimum waveform and chirp waveform;

FIG. 11 shows a prior art graph of a possible frequency spectrum of a bandlimiting filter used in FIG. 12D;

FIG. 12A shows a graph of target transfer function magnitude responses versus frequency; target as appearing in equations (29)-(31) and (67)-(71).

FIG. 12B shows a graph of noise power spectrum versus frequency as appearing in equations (29)-(31) and (67)-(71).

FIG. 12C shows a graph of clutter power spectrum versus frequency as appearing in equations (29)-(31) and (67)-(71).

FIG. 12D shows a graph of the square root of the noise power spectrum divided by target transfer function magnitude response that has been modified by the transmitter output filter versus frequency as appearing in right side of equation (23).

Figure 13A:
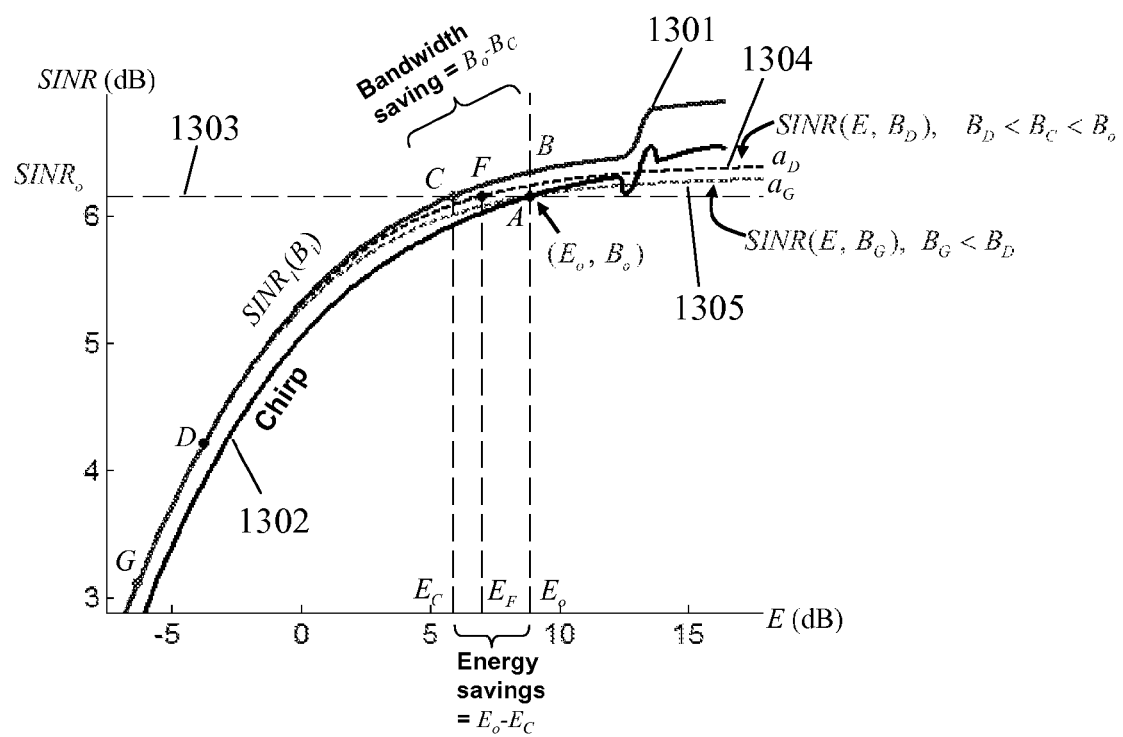
FIG. 13A shows graphs of simultaneous energy and bandwidth saving design—SINR versus energy for optimum waveform and chirp using target, noise and clutter spectra shown in FIG. 12 and transmitter output filter given by FIG. 11.

FIG. 13A shows graphs of simultaneous energy and bandwidth saving design—SINR versus Energy for optimum waveform and chirp using target, noise and clutter spectra shown in FIG. 12 and transmitter output filter given by FIG. 11; generated using equations (39), (48), and (51) for the optimum waveforms 1001, 1002 and 1004 and (63) for the chirp waveform 1002.

Figure 13B:
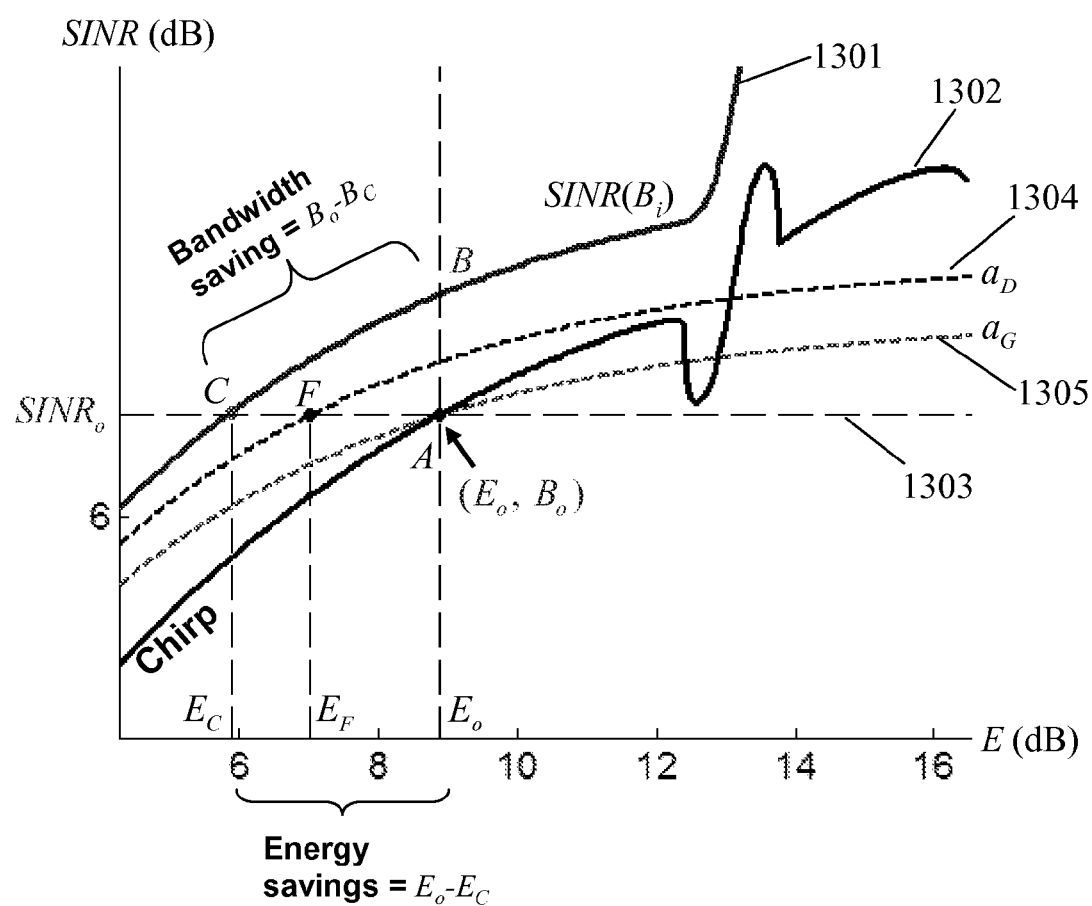
FIG. 13B shows graphs of simultaneous energy and bandwidth saving design—SINR versus Energy for optimum waveform and chirp using target-enlarged version of FIG. 13A.

FIG. 13B shows graphs of simultaneous energy and bandwidth saving design-SINR versus Energy for optimum waveform and chirp using target-Enlarged version of FIG. 13A; generated using equations (39), (48), and (51) for the optimum waveforms and (63) for the chirp waveform.

Figure 14A:
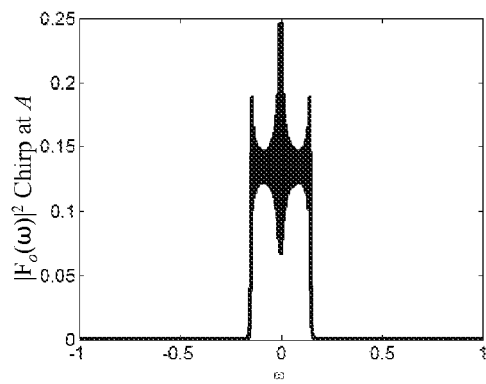
FIG. 14A shows a graph of the transform of the chirp transmit signal magnitude versus frequency corresponding to the design point A in FIG. 13.
Figure 14B:
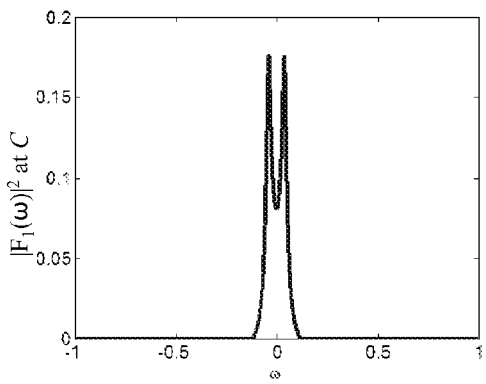
FIG. 14B shows a graph of the transform of the optimum transmitter signal magnitude versus frequency corresponding to the design point C in FIG. 13.
Figure 14C:
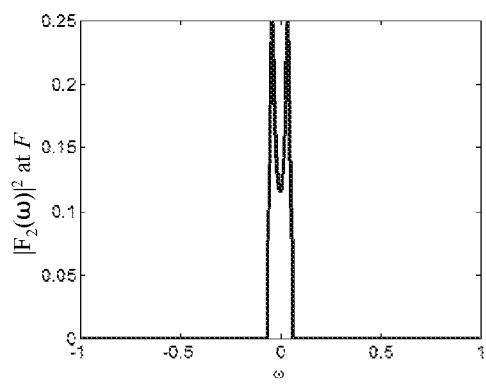
FIG. 14C shows a graph of the transform of the optimum transmitter signal magnitude versus frequency corresponding to the design point F in FIG. 13.
Figure 14D:
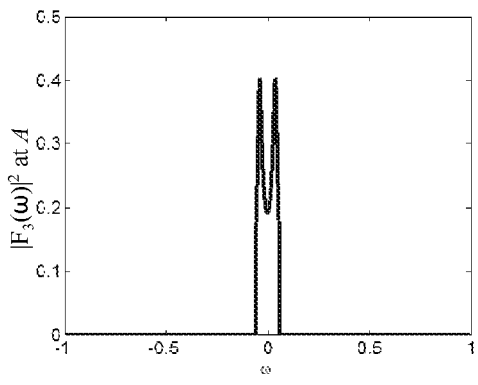
FIG. 14D shows a graph of the transform of the optimum transmitter signal magnitude versus frequency corresponding to the design point A in FIG. 13.
Figure 15A:
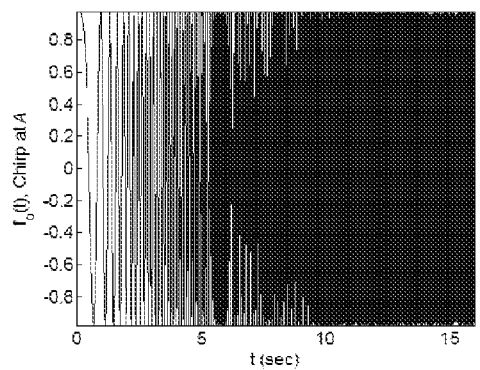
FIG. 15A shows a graph of the chirp transmit signal versus time associated with FIG. 14A and the design point A in FIG. 13.
Figure 15B:
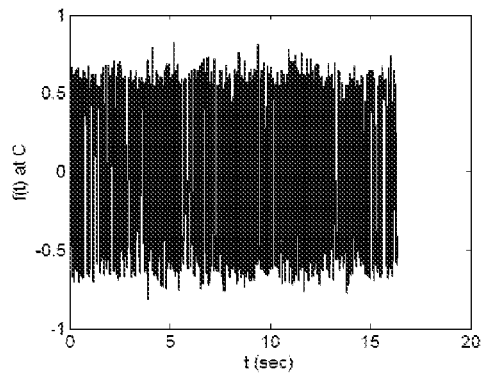
FIG. 15B shows a graph of the optimum transmit signal versus time associated with FIG. 14B and the design point C in FIG. 13.
Figure 15C:
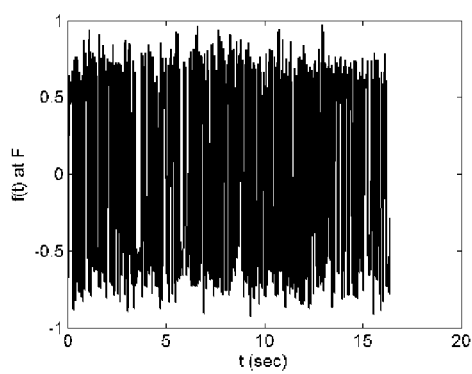
FIG. 15C shows a graph of the optimum transmit signal versus time associated with FIG. 14C and the design point F in FIG. 13.
Figure 15D:
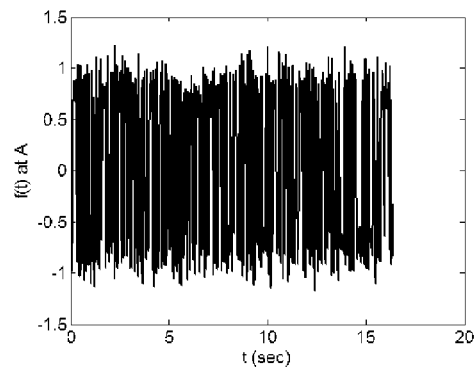
FIG. 15D shows a graph of the optimum transmit signal versus time associated with FIG. 14D and the design point A in FIG. 13.
Figure 16:
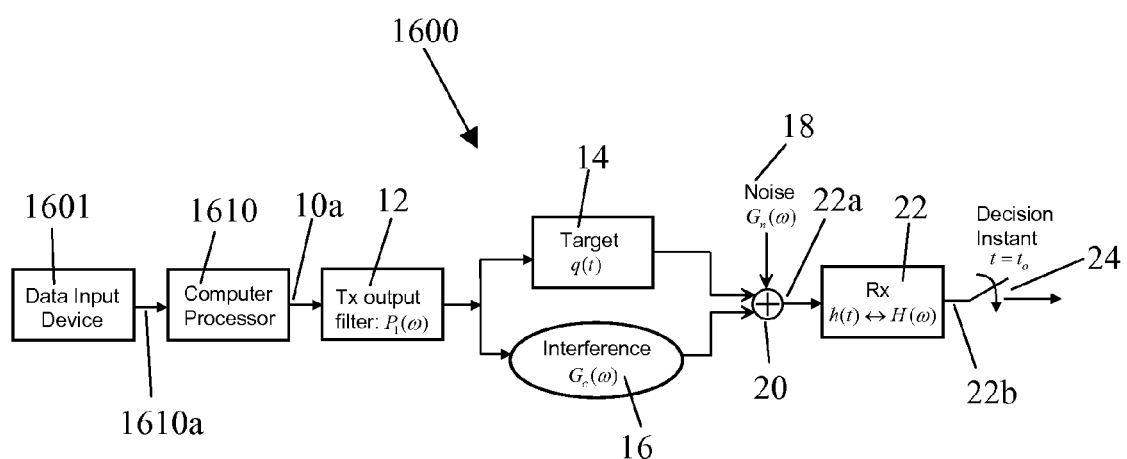
FIG. 16 shows a diagram of a system, apparatus, and/or method in accordance with another embodiment of the present invention.

FIG. 14A shows a graph of the transform of the chirp transmit signal magnitude versus frequency corresponding to the design point A in FIG. 13;

FIG. 14B shows a graph of the transform of the optimum transmitter signal magnitude versus frequency corresponding to the design point C in FIG. 13 generated using equation (36);

FIG. 14C shows a graph of the transform of the optimum transmitter signal magnitude versus frequency corresponding to the design point F in FIG. 13 generated using equation (42);

FIG. 14D shows a graph of the transform of the optimum transmitter signal magnitude versus frequency corresponding to the design point A in FIG. 13 generated using equation (42);

FIG. 15A shows a graph of a typical chirp transmit signal versus time associated with FIG. 14A and the design point A in FIG. 13;

FIG. 15B shows a graph of the optimum transmit signal versus time associated with FIG. 14B and the design point C in FIG. 13; generated using equations (76)-(79);

FIG. 15C shows a graph of the optimum transmit signal versus time associated with FIG. 14C and the design point F in FIG. 13; generated using equations (76)-(79);

FIG. 15D shows a graph of the optimum transmit signal versus time associated with FIG. 14D and the design point A in FIG. 13; generated using equations (76)-(79); and FIG. 16 shows a diagram 1600 of a system, apparatus, and/or method in accordance with another embodiment of the present invention. The diagram 1600 shows a data input device 1601, a computer processor 1610, a transmitter output filter 12, a target 14, interference 16, noise 18, a summation block 20, receiver 22, and a switch 24. The computer processor 1610 may implement one or more methods in accordance with one or more embodiments of the present invention. The computer processor 1610 may use the equations in (67)-(80) to determine an appropriate transmit signal to be provided at the output 10a. Appropriate input parameters for using in calculations, such as calculations using the equations in (67)-(80) may be provided by data input device 1601. The data input device 1601 may be an interactive device such as a computer keyboard or computer mouse which an operator can use to input data or input parameters. The data input device 1601 may also be a computer data base which stores various data or input parameters. The computer processor 1610 may receive parameters from the data input device 1601 at its input 1610a and may generate a desired transmit waveform at its output. The data input device 1601 may supply required input parameters such as target transform, clutter and noise spectra, and bandwidth to the computer processor 1610. The computer processor 1610 can be a software toolbox or actual hardware implementation of the methods described previously.

Define $\Omega_+$ as shown in FIGS. 3C and 3D to represent the frequencies over which $y^2(\omega)$ in equation (21) is strictly positive, and let $\Omega_o$ represent the complement of $\Omega_+$. As shown in FIGS. 3C and 3D, observe that the set $\Omega_+$ is a function of the noise and target spectral characteristics as well as the constraint constant $\lambda$. In terms of $\Omega_+$, we have $$|F(\omega)|^2 = \begin{cases} y^2(\omega), & \omega \in \Omega_+, \\ 0, & \omega \in \Omega_O. \end{cases} \quad (22)$$

From (21), $y^2(\omega) > 0$ over $\Omega_+$ gives the necessary condition $$\lambda \geq \max_{\omega \in \Omega_+} \frac{\sqrt{G_n(\omega)}}{|Q(\omega)|} \quad (23)$$

and the energy constraint in (15) when applied to (21) gives $$E = \frac{1}{2\pi} \int_{\Omega_+} y^2(\omega) d\omega = \quad (24)$$

$$\frac{\lambda}{2\pi} \int_{\Omega_+} \frac{\sqrt{G_n(\omega)} |Q(\omega)|}{G_c(\omega)} d\omega - \frac{1}{2\pi} \int_{\Omega_+} \frac{G_n(\omega)}{G_c(\omega)} d\omega$$

or, for a given value of E, we have $$\lambda = \frac{E + \frac{1}{2\pi} \int_{\Omega_+} \frac{G_n(\omega)}{G_c(\omega)} d\omega}{\frac{1}{2\pi} \int_{\Omega_+} \frac{\sqrt{G_n(\omega)} |Q(\omega)|}{G_c(\omega)} d\omega} \Box \lambda(E). \quad (25)$$

Clearly, $\lambda(E)$ in (25) must satisfy the inequality in (23) as well. This gives rise to the concept of transmitter energy threshold that is characteristic to this design approach.

Transmitter Threshold Energy

From (23)-(25), the transmit energy E must be such that $\lambda(E)$ obtained from (25) should satisfy (23). If not, E must be increased to accommodate it, and hence it follows that there exists a minimum threshold value for the transmit energy below which it will not be possible to maintain $|F(\omega)|^2 > 0$. This threshold value is given by $$E_{min} = \left(\max_{\omega \in \Omega_+} \frac{\sqrt{G_n(\omega)}}{|Q(\omega)|}\right) \frac{1}{2\pi} \int_{\Omega_+} \frac{\sqrt{G_n(\omega)} |Q(\omega)|}{G_c(\omega)} d\omega - \frac{1}{2\pi} \int_{\Omega_+} \frac{G_n(\omega)}{G_c(\omega)} d\omega \quad (26)$$

and for any operating condition, the transmit energy E must exceed $E_{min}$. Clearly, the minimum threshold energy depends on the target, clutter and noise characteristics as well as the bandwidth under consideration. With $E > E_{min}$, substituting (20)-(21) into the $SINR_{max}$ in (14) we get $$SINR_{max} = \frac{1}{2\pi} \int_{\Omega_+} \frac{|Q(\omega)|^2 y^2(\omega)}{\lambda \sqrt{G_n(\omega)} |Q(\omega)|} d\omega \quad (27)$$

$$= \frac{1}{2\pi} \int_{\Omega_+} \frac{|Q(\omega)|}{\lambda(E)\sqrt{G_n(\omega)}} \frac{\sqrt{G_n(\omega)}(\lambda(E)|Q(\omega)| - \sqrt{G_n(\omega)})}{G_c(\omega)} d\omega$$

$$\frac{1}{2\pi} \int_{\Omega_+} \left(|Q(\omega)| - \frac{\sqrt{G_n(\omega)}}{\lambda(E)}\right) \frac{|Q(\omega)|}{G_c(\omega)} d\omega.$$

Finally making use of (25), the output $SINR_{max}$ becomes $$SINR_1 = \frac{1}{2\pi} \int_{\Omega_+} \frac{|Q(\omega)|^2}{G_c(\omega)} d\omega - \frac{\left(\frac{1}{2\pi} \int_{\Omega_+} \frac{|Q(\omega)|\sqrt{G_n(\omega)}}{G_c(\omega)} d\omega\right)^2}{E + \frac{1}{2\pi} \int_{\Omega_+} \frac{G_n(\omega)}{G_c(\omega)} d\omega} \quad (28)$$

$$= a - \frac{c}{\lambda(E)} = a - \frac{c^2}{E+b}$$

$$= \frac{aE + (ab - c^2)}{E + b}$$

where $$a = \frac{1}{2\pi} \int_{\Omega_+} \frac{|Q(\omega)|^2}{G_c(\omega)} d\omega, \quad (29)$$

$$b = \frac{1}{2\pi} \int_{\Omega_+} \frac{G_n(\omega)}{G_c(\omega)} d\omega, \quad (30)$$

and $$c = \frac{1}{2\pi} \int_{\Omega_+} \frac{\sqrt{G_n(\omega)} |Q(\omega)|}{G_c(\omega)} d\omega. \quad (31)$$

Notice that $ab - c^2 \geq 0$. (This was published in Waveform Diversity and Design conference, Kauai, Hi., January 2006).

The optimization problem in (14)-(15) can be restated in term of $\Omega_+$ as follows: Given $Q(\omega)$, $G_c(\omega)$, $G_n(\omega)$ and the transmit energy E, how to partition the frequency axis into an "operating band" $\Omega_+$ and a "no show" band $\Omega_o$ so that $\lambda_+$ obtained from (25) satisfies (23) and $SINR_{max}$ in (27)-(28) is also maximized. In general maximization of $SINR_{max}$ in (27)-(28) over $\Omega_+$ is a highly nonlinear optimization problem for arbitrary $Q(\omega)$, $G_c(\omega)$ and $G_n(\omega)$.

In what follows a new approach to this problem is presented.

AN EMBODIMENT OF THE PRESENT INVENTION—DESIRED BAND APPROACH

One approach in this situation is to make use of the "desired frequency band" of interest $B_o$ this is usually suggested by the target response $Q(\omega)$ (and the transmitter output filter) to determine the operating band $\Omega_+$. The desired band $B_o$ can represent a fraction of the total available bandwidth, or the whole bandwidth itself. The procedure for determining $\Omega_+$ is illustrated in FIGS. 3A-3C and FIGS. 3B-3D for two different situations. In FIGS. 3A-3D, the frequency band $B_o$ represents the desired band, and because of the nature of the noise and clutter spectra, it may be necessary to operate on a larger region $\Omega_+$ in the frequency domain. Thus the desired band $B_o$ is contained always within the operating band $\Omega_+$. To determine $\Omega_+$, using equation (23) we project the band $B_o$ onto the spectrum $\sqrt{G_n(\omega)}/|Q(\omega)|$ and draw a horizontal line corresponding to $$\lambda_{B_o} = \max_{\omega \in B_o} \frac{\sqrt{G_n(\omega)}}{|Q(\omega)|} \quad (32)$$

as shown there. Define $\Omega_+(B_o)$ to represent the frequency region where $$\omega \in \Omega_+(B_o): \frac{\sqrt{G_n(\omega)}}{|Q(\omega)|} \leq \lambda_{B_o} = \max_{\omega \in B_o} \frac{\sqrt{G_n(\omega)}}{|Q(\omega)|}. \quad (33)$$

This procedure can give rise to two situations as shown in FIG. 3A and FIG. 3B. In FIG. 3A, the operating band $\Omega_+(B_o)$ coincides with the desired band $B_o$ as shown in FIG. 3C, whereas in FIG. 3B, the desired band $B_o$ is a subset of $\Omega_+(B_o)$ as seen from FIG. 3D.

Knowing $\Omega_+(B_o)$, one can compute $\lambda = \lambda(E)$ with the help of equation (25) over that region, and examine whether $\lambda$ so obtained satisfies (23). If not, the transmitter energy E is insufficient to maintain the operating band $\Omega_+(B_o)$ given in (33), and either E must be increased, or $\Omega_+(B_o)$ must be decreased (by decreasing $B_o$) so that (23) is satisfied. Thus for a given desired band $B_o$ (or an operating band $\Omega_+(B_o)$), as remarked earlier, there exists a minimum transmitter threshold energy $E_{B_o}$, below which it is impossible to maintain $|F(\omega)|^2 > 0$ over that entire operating band.

Threshold Energy

From equations (24) and (32), we obtain the minimum transmitter threshold energy in this case to be the following (as shown in S. U. Pillai, KeYong Li and B. Himed, "Energy Threshold Constraints in Transmit Waveform Design," 2006 international Waveform Diversity & Design Conference, Kauai, Hi., Jan. 22-27, 2006.)

$$E_{B_o} = \frac{\lambda_{B_o}}{2\pi} \int_{\Omega_+(B_o)} \frac{\sqrt{G_n(\omega)} |Q(\omega)|}{G_c(\omega)} d\omega - \frac{1}{2\pi} \int_{\Omega_+(B_o)} \frac{G_n(\omega)}{G_c(\omega)} d\omega = \quad (34)$$

$$\lambda_{B_o} c_o - b_o > 0.$$

With $E \geq E_{B_o}$, the $SINR_{max}$ in (28) can be readily computed. In particular with $E=E_{B_o}$, we get $$SINR_1 = SINR_1(B_o) = a_o - \frac{c_o^2}{E_{B_o} + b_o}. \quad (35)$$

Here $a_o$, $b_o$ and $c_o$ are as given in (29)-(31) with $\Omega_+$ replaced by $\Omega_+(B_o)$. Eq. (35) represents the performance level for bandwidth $B_o$ using its minimum threshold energy. From (21), we also obtain the optimum transmit signal transform corresponding to energy $E_{B_o}$ to be $$|F(\omega)|^2 = \begin{cases} \frac{\sqrt{G_n(\omega)}\left(\lambda_{B_o}|Q(\omega)| - \sqrt{G_n(\omega)}\right)}{G_c(\omega)}, & \omega \in \Omega_+(B_o) \\ 0, & \omega \in \Omega_o \end{cases} \quad (36)$$

$$= \begin{cases} \sqrt{G_n(\omega)}\left(\left(\max_{\omega \in B_o} \frac{\sqrt{G_n(\omega)}}{|Q(\omega)|}\right) - \frac{\sqrt{G_n(\omega)}}{|Q(\omega)|}\right)\frac{|Q(\omega)|}{G_c(\omega)}, \\ \omega \in \Omega_+(B_o) \\ 0, \\ \omega \in \Omega_o \end{cases}$$

To summarize, to maintain a given desired band $B_o$, there exists an operating band $\Omega_+(B_o) \geq B_o$ over which $|F(\omega)|^2 > 0$ and to guarantee this, the transmit energy must exceed a minimum threshold value $E_{B_o}$ given by (34).

FIGS. 4A-F shows the transmitter threshold energy E in (34) and the corresponding SINR in (35) as a function of the desired bandwidth $B_o$ for various target, clutter, and noise spectra. Target to noise ratio (TNR) is set at 0 dB, and the clutter to noise power ratio (CNR) is set at 20 dB here. The total noise power is normalized to unity. The desired bandwidth $B_o$ is normalized with respect to the maximum available bandwidth (e.g., carrier frequency).

In FIGS. 4A-F, the noise and clutter have flat spectra and for the highly resonant target (solid line), the required minimum energy threshold and the SINR generated using (34)-(35) reach a saturation value for small values of the bandwidth. In the case of the other two targets, additional bandwidth is required to reach the maximum attainable SINR. This is not surprising since for the resonant target, a significant portion of its energy is concentrated around the resonant frequency. Hence once the transmit signal bandwidth reaches the resonant frequency, it latches onto the target features resulting in maximum SINR at a lower bandwidth.

FIGS. 5A-F show results for a new set of clutter and noise spectra as shown there; the transmitter threshold energy E in (34) and the corresponding SINR in (35) as a function of the desired bandwidth $B_o$ show similar performance details.

From FIG. 5F, in the case of the resonant target (solid curve) the SINR reaches its peak value resulting in saturation even when $B_o$ is a small fraction of the available bandwidth. This is because in that case, the transmit waveform is able to latch onto the dominant resonant frequency of the target. On the other extreme, when the target has flat characteristics (dotted curve), there are no distinguishing frequencies to latch on, and the transmitter is unable to attain the above maximum SINR even when $B_o$ coincides with the total available bandwidth. For a low pass target (dashed curve), the transmitter is indeed able to deliver the maximum SINR by making use of all the available bandwidth.

As FIG. 3B shows, $\Omega_+(B_o)$ can consist of multiple disjoint frequency bands whose complement $\Omega_o$ represents the "no show" region. Notice that the "no show" region $\Omega_o$ in the frequency domain in (36) for the optimum transmit signal can be controlled by the transmit energy E in (25). By increasing E, these "no show" regions can be made narrower and this defines a minimum transmitter threshold energy $E_\infty$ that allows $\Omega_+(B_o)$ to be the entire available frequency axis. To determine $E_\infty$, let $\lambda_\infty$ represent the maximum in (23) over the entire frequency axis. Thus $$\lambda_\infty = \max_{|\omega|<\infty} \frac{\sqrt{G_n(\omega)}}{|Q(\omega)|}, \quad (37)$$

and let $a_\infty$, $b_\infty$, $c_\infty$ refer to the constants a, b, c in (29)-(31) calculated with $\Omega_+$ representing the entire frequency axis. Then from (24)

$$E_\infty = \lambda_\infty c_\infty - b_\infty \quad (38)$$

$$= \frac{\lambda_\infty}{2\pi}\int_{-\infty}^{+\infty} \frac{\sqrt{G_n(\omega)}|Q(\omega)|}{G_c(\omega)}d\omega - \frac{1}{2\pi}\int_{-\infty}^{+\infty}\frac{G_n(\omega)}{G_c(\omega)}d\omega$$

$$> 0$$

represents the minimum transmit energy (threshold) required to avoid partitioning in the frequency domain. With $E_\infty$ as given by (38), we obtain $SINR_{max}$ to be (use (28))

$$SINR_1(\infty) = a_\infty - \frac{c_\infty}{\lambda_\infty} = a_\infty - \frac{c_\infty^2}{E_\infty + b_\infty} > 0 \quad (39)$$

and $$|F(\omega)|^2 = \frac{\sqrt{G_n(\omega)}\left(\lambda_\infty|Q(\omega)| - \sqrt{G_n(\omega)}\right)}{G_c(\omega)}, \quad |\omega|<\infty. \quad (40)$$

Clearly by further increasing the transmit energy in (39) beyond that in (38) we obtain $$SINR_1 \to a_\infty = \frac{1}{2\pi}\int_{-\infty}^{-\infty}\frac{|Q(\omega)|^2}{G_c(\omega)}d\omega. \quad (41)$$

It follows that to avoid any restrictions in the frequency domain for the transmit signal, the transmitter energy E must exceed a minimum threshold value $E_\infty$ given by (38) and (39) represents the maximum realizable SNR. By increasing E beyond $E_\infty$, the performance can be improved upto that in (41).

In general from (34) for a given desired bandwidth $B_o$, the transmit energy E must exceed its threshold value $E_{B_o}$. With $E > E_{B_o}$ and $\lambda(E)$ as in (25), the corresponding optimum transmit signal transform is given by (see (21) (22))

$$|F(\omega)|^2 = \begin{cases} \frac{\sqrt{G_n(\omega)}\left(\lambda(E)|Q(\omega)| - \sqrt{G_n(\omega)}\right)}{G_c(\omega)}, & \omega \in \Omega_+(B_o) \\ 0, & \omega \in \Omega_o \end{cases} \quad (42)$$

and clearly this signal is different from the minimum threshold energy one in (36). From (28), the performance level $SINR_1(E,B_o)$ corresponding to (42) is given by (35) with $E_{B_o}$ replaced by E. Thus $$SINR_1(E, B_o) = a_o - \frac{c_o^2}{E + b_o} > SINR_1(B_o). \tag{43}$$

From (43), for a given bandwidth $B_o$, performance can be increased beyond that in (35) by increasing the transmit energy. Hence it follows that $SINR_1(B_o)$ represents the minimum performance level for bandwidth $B_o$ that is obtained by using its minimum threshold energy. It is quite possible that this improved performance $SINR_1(E,B_o)$ can be equal to the minimum performance level corresponding to a higher bandwidth $B_1 > B_o$. This gives rise to the concept of Energy-Bandwidth tradeoff at a certain performance level. Undoubtedly this is quite useful when bandwidth is at premium.

FIGS. 5E–5F exhibit the transmit threshold energy and maximum output $SINR_1(B_o)$ as a function of the desired bandwidth $B_o$. Combining these figures using (35), an SINR vs. transmit threshold energy plot can be generated as in FIGS. 6A–C for each target situation.

For example, FIG. 6A–C corresponds to the three different target situations considered in FIG. 5 with clutter and noise spectra as shown there. Notice that each point on the SINR-Energy threshold curve for each target is associated with a specific desired bandwidth. Thus for bandwidth $B_1$, the minimum threshold energy required is $E_1$, and the corresponding SINR equals $SINR_1(B_1)$ in (35). Let A represent the associated operating point in FIG. 6. Note that the operating point A corresponding to a bandwidth $B_1$ has different threshold energies and different performance levels for different targets. From (35), each operating point generates a distinct transmit waveform. As the bandwidth increases, from (39), $SINR \to SINR_1(\infty)$.

Monotonic Property of SINR

The threshold energy and SINR associated with a higher bandwidth is higher. To prove this, consider two desired bandwidths $B_1$ and $B_2$ with $B_2 > B_1$. Then from (32) we have $$\lambda_2 = \max_{\omega \in B_2} \frac{\sqrt{G_n(\omega)}}{|Q(\omega)|} > \lambda_1 = \max_{\omega \in B_1} \frac{\sqrt{G_n(\omega)}}{|Q(\omega)|}, \tag{44}$$

and from FIG. 3, the corresponding operating bandwidths $\Omega_+(B_1)$ and $\Omega_+(B_2)$ satisfy $$\Omega_+(B_2) \supseteq \Omega_+(B_1) \tag{45}$$

From (34) (or (24)), the minimum threshold energies are given by $$E_i = \frac{1}{2\pi} \int_{\Omega_+(B_i)} \sqrt{G_n(\omega)} \left( \lambda_i - \frac{\sqrt{G_n(\omega)}}{Q(\omega)} \right) \frac{|Q(\omega)|}{G_c(\omega)} d\omega, \quad i = 1, 2 \tag{46}$$

and substituting (44) and (45) into (46) we get $$E_2 > E_1 \tag{47}$$

Also from (27), the performance levels at threshold energy $SINR_1(B_i)$ equals $$SINR_1(B_i) = \frac{1}{2\pi} \int_{\Omega_+(B_i)} \left( |Q(\omega)| - \frac{\sqrt{G_n(\omega)}}{\lambda_i} \right) \frac{|Q(\omega)|}{G_c(\omega)} d\omega \tag{48}$$

and an argument similar to (44)-(45) gives $$SINR_1(B_2) \geq SINR_1(B_1) \tag{49}$$

for $B_2 > B_1$. Thus as FIGS. 5A–F-FIGS. 6A–C show, $SINR_1(B_i)$ is a monotonically non-decreasing function of both bandwidth and energy. FIG. 7 illustrates this SINR-energy relation for the target with flat spectrum shown in FIG. 5A. In FIG. 7, the two operating points A and B are associated with bandwidths $B_1$ and $B_2$, threshold energies $E_1$ and $E_2$, and performance levels $SINR_1(B_1)$ and $SINR_1(B_2)$ respectively. Since $$B_2 > B_1 \Rightarrow E_2 \geq E_1 \text{ and } SINR_1(B_2) \geq SINR_1(B_1). \tag{50}$$

The distinct transmit waveforms $|F_1(\omega)|^2$ and $|F_2(\omega)|^2$ associated with these operating point A and B are given by (36) and they are shown in FIGS. 8A and 8B.

Consider the operating point A associated with the desired bandwidth $B_1$. If the transmit energy $E$ is increased beyond the corresponding threshold value $E_1$ with bandwidth held constant at $B_1$, the performance $SINR_1(E, B_1)$ increases beyond that at A since from (43)

$$SINR_1(E, B_1) = a_1 - \frac{c_1^2}{E + b_1} \geq a_1 - \frac{c_1^2}{E_1 + b_1} = SINR_1(B_1) \tag{51}$$

and it is upper bounded by $a_1$. Here $a_1$ corresponds to the SINR performance for bandwidth $B_1$ as the transmit energy $E \to \infty$. Note that $a_1$, $b_1$ and $c_1$ are the constants in (29)-(31) with $\Omega_+$ replaced by $\Omega_+(B_1)$. The dashed curve $Aa_1$ in FIG. 7 represents $SINR_1(E, B_1)$ for various values of E. From (42), each point on the curve $Aa_1$ generates a new transmit waveform as well.

Interestingly the dashed curves in FIG. 7 cannot cross over the optimum performance (solid) curve $SINR(B_i)$. If not, assume the performance $SINR_1(E,B_1)$ associated with the operating point A crosses over $SINR(B_i)$ at some $E_1' > E_1$. Then from (47), there exists a frequency point $B_1' > B_1$ with threshold energy $E_1'$ and optimum performance $SINR_1(B_1')$. By assumption, $$SINR_1(E_1', B_1) > SINR_1(B_1') \tag{52}$$

But this is impossible since $SINR_1(B_1')$ corresponds to the maximum SINR realizable at bandwidth $B_1'$ with energy $E_1'$, and hence performance at a lower bandwidth $B_1$ with the same energy cannot exceed it. Hence (52) cannot be true and we must have $$SINR_1(E_1', B_1) \leq SINR_1(B_1'), \tag{53}$$

i.e., the curves $Aa_1$, $Ba_2$, etc. does not cross over the optimum performance curve ABD.

In FIG. 7, assume that the saturation performance value $$a_1 \geq SINR_1(B_2), \tag{54}$$

i.e., the maximum performance level for bandwidth $B_1$ is greater than of equal to the performance level associated with the operating point B with a higher bandwidth $B_2$ and a higher threshold energy $E_2$. Draw a horizontal line through B to intersect the curve $Aa_1$ at C, and drop a perpendicular at C to intersect the x-axis at $E_3$. From (51) with $E = E_3$ we get $$SINR_1(E_3, B_1) = SINR_1(B_2). \tag{55}$$

Thus the operating point C on the curve $Aa_1$ is associated with energy $E_3$, bandwidth $B_1$ and corresponds to a performance level of $SINR_1(B_2)$ associated with a higher bandwidth. Notice that $$E_3 > E_2 > E_1, \text{ and } B_1 < B_2. \tag{56}$$

In other words, by increasing the transmit energy from $E_1$ to $E_3$ while holding the bandwidth constant at $B_1$, the performance equivalent to a higher bandwidth $B_2$ can be realized provided $B_2$ satisfies (54). As a result, energy-bandwidth tradeoff is possible within reasonable limits. The transmit waveform $|F_3(\omega)|^2$ associated with the operating point C is obtained using (42) by replacing E and $B_0$ there with $E_3$ and $B_1$ respectively. and it is illustrated in FIG. 8C. In a similar manner, the waveforms corresponding to the operating points A and B in FIG. 7 can be obtained using equation (42) by replacing the energy-bandwidth pair $(E,B_0)$ there with $(E_1, B_2)$ and $(E_2,B_2)$ respectively. These waveforms are shown in FIG. 8A and FIG. 8B respectively A comparison with FIGS. 8A and 8B show that the waveform at C is different from those associated with operating point A and B.

It is important to note that although the transmit waveform design $|F_3(\omega)|^2$ and $|F_1(\omega)|^2$ correspond to the same bandwidth (with different energies $E_3$ and $E_1$), one is not a scaled version of the other. Changing transmit energy from $E_1$ to $E_3$ unleashes the whole design procedure and ends up in a new waveform $|F_3(\omega)|^2$ that maintains a performance level associated with a larger bandwidth $B_2$.

The question of how much bandwidth tradeoff can be achieved at an operating point is an interesting one. From the above argument, equality condition in (54) gives the upper bound on how much effective bandwidth increment can be achieved by increasing the transmit energy. Notice that for an operating point A, the desired bandwidth $B_1$ gives the operating bandwidth $\Omega_+(B_1)$ and from (29) the performance limit $$a_1 = \frac{1}{2\pi} \int_{\Omega_+(B_1)} \frac{|Q(\omega)|^2}{G_c(\omega)} d\omega \qquad (57)$$

for bandwidth $B_1$ can be computed. Assume $B_2 > B_1$, and from (48) $SINR_1(B_2)$ the minimum performance at $B_2$ also can be computed, and for maximum bandwidth swapping the non-linear equation $$a_1 = SINR_1(B_2) \qquad (58)$$

must be solved for $B_2$. Then $$\Delta B(B_1) = B_2 - B_1 \qquad (59)$$

represents the maximum bandwidth enhancement that can be realized at $B_1$. This is illustrated in for the target situation in FIG. 7. Notice that the maximum operating bandwidth if finite in any system due to sampling considerations and after normalization, it is represented by unity. Hence the upper limit in (59) must be $\min(1, B_2)$. This gives $$\Delta B = \min(1,B_2) - B_1 \qquad (60)$$

and this explains the linear nature of $\Delta B$ for larger value of $B_i$. In that case, bandwidth can be enhanced by $1-B_1$ only.

The design approach described in this section requires the knowledge of the target characteristics in addition to the clutter and noise spectra.

A further embodiment of the present invention, which concerns savings in bandwidth and energy using waveform design is disclosed as follows.

The waveform design procedure described in the previous section can be extended in such a way as to result in simultaneous savings in bandwidth and energy with respect to any prior art transmit waveform such as a chirp waveform.

To realize this goal, let $F_o(\omega)$ represent the transform of any conventional waveform such as a chirp signal with energy $E_o$ and using bandwidth $B_o$. Then $$E_o = \frac{1}{2\pi} \int_{-B_o}^{B_o} |F_o(\omega)|^2 d\omega \qquad (61)$$

and for a given target with transform $Q(\omega)$, and clutter and noise with spectra $G_c(\omega)$ and $G_n(\omega)$, from equation (12), the optimum receiver is given by $$H_o(\omega) = \frac{Q^*(\omega)F_o^*(\omega)}{G_c(\omega)|F_o(\omega)|^2 + G_n(\omega)} e^{-j\omega t_o} \qquad (62)$$

and from equation (11), the corresponding maximum SINR output is given by $$SINR_o = \frac{1}{2\pi} \int_{-B_o}^{B_o} \frac{|Q(\omega)|^2 |F_o(\omega)|^2}{G_c(\omega)|F_o(\omega)|^2 + G_n(\omega)} d\omega. \qquad (63)$$

Notice that the output $SINR_o$ in equation (63) is a function of two independent parameters, the desired bandwidth $B_o$ and energy $E_o$, and for comparison purposes these parameters can be made equal to their corresponding values obtained using the optimum waveform design as described below.

In the case of the optimum waveform design, for a given desired bandwidth $B_o$, the minimum required energy is given by $E_{B_o}$ in equation (34), and the corresponding maximum output SINR equals $SINR_1$ and that is given by $$SINR_1 = SINR_1(B_o) = a_o - \frac{c_o^2}{E_o + b_o} \qquad (64)$$

as in equation (35), where $$E_o = E_{B_o} \qquad (65)$$

and $a_o$, $b_o$, $c_o$ are as described in equations (29)-(31) with $\Omega_+$ there replaced by the operating bandwidth $\Omega_+(B_o)$ as defined in equation (33).

From the previous section on "An Embodiment of the Present Invention—The Desired Band Approach", to compute the $SINR_1$ in equation (64) corresponding to the optimum method, the desired frequency bandwidth $B_o$ is used first to define an operating bandwidth $\Omega_+(B_o)$, and then integration is carried out over $\Omega_+(B_o)$ in equations (27)-(34). As FIG. 3B shows the operating bandwidth $\Omega_+(B_o)$ in some cases can exceed the desired band $(-B_o, B_o)$. In the context of bandwidth comparison with respect to a given waveform $F_o(\omega)$ with bandwidth $B_o$, it is necessary to make sure that the operating bandwidth $\Omega_+(B_o)$ does not exceed the desired bandwidth $(-B_o, B_o)$. To realize this goal, a transmitter output filter $P_1(\omega)$ as in FIG. 11 whose pass-band bandwidth B coincides with the given desired bandwidth can be employed. From FIG. 1, the transmitter output filter $P_1(\omega)$ modifies the given target transform $Q(\omega)$ to $Q(\omega)P_1(\omega)$, and also modifies the given clutter spectrum $G_c(\omega)$ to $G_c(\omega)P_1(\omega)$. As a result, when FIG. 3B is redrawn using this modified target transform $Q(\omega)P_1(\omega)$ to determine the operating bandwidth $\Omega_+(B_o)$, it is easy to see that $\Omega_+(B_o)$ coincides with $(-B_o, B_o)$ as shown in FIG. 12D, and hence the operating bandwidth never exceeds the desired bandwidth B in this approach. This technique of inserting a transmitter output filter $P_1(\omega)$ with pass-band with $B_o$ is employed whenever bandwidth savings comparison with respect to a given waveform is being investigated. Here onwards we will assume that the operating bandwidth $\Omega_+(B_o)$ and the desired band $(-B_o, B_o)$ are equal to each other.

The solid curve 1001 in FIG. 10 represents the optimum $SINR_1$ in equation (64) as a function of energy $E_o$ for a hypothetical target, noise and clutter spectra using the optimum waveform design in equation (36) with bandwidth $B_o$. By employing a transmitter output filter $P_1(\omega)$ with pass-band with $B_o$, the operating bandwidth $\Omega_+(B_o)$ here coincides with the desired bandwidth $B_o$. Thus each point on the solid curve 1001 corresponds to an energy-bandwidth pair $(E_o, B_o)$. Using the same pair $(E_o, B_o)$ for the given transmit signal such as the chirp waveform, the corresponding $SINR_o$ is computed using equation (63) and it is plotted as the solid curve 1002 in FIG. 10. The given waveform $F_o(\omega)$ being generally suboptimum, the $SINR_o$ curve 1002 will usually fall below the optimum $SINR_1$ curve 1001 as shown in FIG. 10. Thus points A and B in FIG. 10 (on curves 1001 and 1002 respectively) correspond to the same bandwidth-energy pair $(E_o, B_o)$ but with different performance levels $SINR_o$ and $SINR_1$ respectively with $$SINR_o \leq SINR_1 \qquad (66)$$

where $SINR_o$ represents the performance in equation (63) when the given transmit waveform is used, and $SINR_1$ represents the performance in equation (64) when the optimum transmit waveform given by equation (36) is used. Draw a horizontal line 1003 through A to meet the solid curve 1001 at C as shown in FIG. 10. The operating point C in 1001 has performance level equal to $SINR_o$ and corresponds to some energy-bandwidth pair $(E_C, B_C)$ that can be solved by equating $SINR_1(B_C)$ with $SINR_o$. Thus $B_C$ is obtained by solving $$SINR_1(B_C) = a_C - \frac{c_C^2}{E_C + b_C} = SINR_o. \qquad (67)$$

Here $a_C$, $b_C$, $c_C$ are as described in equations (29)-(31) with $\Omega_+$ replaced by the operating bandwidth $\Omega_+(B_C) = B_C$, and $E_C$ is given by equation (34) with $B_o$ replaced by $B_C$. Since $SINR_o \leq SINR_1(B_o)$, and the operating point C falls below the point B in FIG. 10, from equation (50) we have $$B_C < B_o, E_C < E_o. \qquad (68)$$

As a result, the optimum waveform design $F_1(\omega)$ corresponding to the operating point C is given by equation (36) with $B_o$ replaced by $B_C$ with the pass-band for $P_1(\omega)$ in FIG. 11 extending up to $B_C$. Hence $F_1(\omega)$ uses the energy-bandwidth pair $(E_C, B_C)$ and from equation (68) this pair is uniformly superior to the given pair $(E_o, B_o)$, and it performs at the same level $SINR_o$ as the given transmit waveform. Thus for a given waveform $F_o(\omega)$ associated with operating point A in curve 1002, simultaneous savings in both bandwidth and energy are possible by making use of the optimum waveform design $F_o(\omega)$ that corresponds to the operating point C in curve 1001. The operating point C corresponds to the minimum energy design for the same performance level and the maximum saving in energy equals $E_o - E_C > 0$, and the corresponding bandwidth saving equals $B_o - B_C$.

Interestingly, additional savings in bandwidth can be made at the expense of more transmit energy. To see this, consider an operating point D that is below C on the optimum design curve 101 marked $SINR_1(B_i)$. From equation (50), the design point D operates with lower bandwidth $B_D < B_C$ and uses energy $E_D$ given by equation (34) with $B_o$ replaced by $B_D$, and provides lower performance level $SINR_1(B_D)$. To increase the performance level beyond $SINR_1(B_D)$, the transmit energy E can be increased beyond its threshold value $E_D$ and from equation (43) and equation (51) increase in transmit energy gives the performance $$SINR_1(E, B_D) = a_D - \frac{c_D^2}{E + b_D} \qquad (69)$$

where $a_D$, $b_D$ and $c_D$ are as in equations (29), (30) and (31) with $\Omega_+$ replaced by $\Omega_+(B_D) = B_D$. The dashed curve $Da_D$ (curve 1004) in FIG. 10 represents $SINR_1(E, B_D)$ for various values of energy E. Each point on curve 1004 generates a new transmit waveform as given by equation (42). The dashed curve 1004 meets the horizontal line AC (curve 1003) at F that corresponds to energy $E_F$. Hence from equation (69)

$$SINR_1(E_F, B_D) = SINR_o. \qquad (70)$$

In other words, the optimum design $|F_2(\omega)|^2$ in equation (42) with energy-bandwidth pair $(E_F, B_D)$ also maintains the same output performance as $SINR_o$. In this case, the useable bandwidth has further decreased from $B_C$ to $B_D$, at the expense of increase in transmit energy from $E_C$ to $E_F$.

Proceeding in this manner, we observe that the dashed curve 1005 in FIG. 10 given by $Ga_G$ that passes through the initial design point A uses minimum bandwidth $B_G$. The operating point G on the optimum $SINR_1$ curve 1001 uses bandwidth $B_G$, energy $E_G$ and gives out performance $SINR_1$ $(B_G)$. By increasing energy from $E_G$ to $E_o$, while bandwidth is held at $B_G$, the performance $SINR_1(E, B_G)$ defined as in equation (69) with $B_D$ replaced by $B_G$, can be increased to $SINR_o$, and proceeding as in equation (70) by equating $SINR_1$ $(E, B_G)$ to $SINR_o$ we get $$SINR_1(E_o, B_G) = SINR_o, \qquad (71)$$

i.e., the energy required for the optimum design at point A on curve 1005 is the same as the original transmit signal energy $E_o$. Thus $B_G$ represents the minimum bandwidth that can be used without the transmit signal energy exceeding $E_o$ for the optimum design, and $B_o - B_G$ represents the corresponding maximum savings in bandwidth. Notice that the design point A on the dashed curve 1005 generates a new transmit waveform $|F_3(\omega)|^2$ according to equation (42) with $B_o$ replaced by $B_G$ there.

If we are prepared to use additional transmit energy beyond $E_o$, then by starting with operating points that are below G on the optimum curve 1001 and using additional transmit energy $E > E_o$, performance equal to $SINR_o$ can be realized. Since operating points below G have lower bandwidth compared to $B_G$, these designs use even lower bandwidths at the expense of additional transmit energy.

In summary, optimum designs that start from operating points such as D located in between G and C on the curve 1001, result in simultaneous savings in energy and bandwidth for the same SINR performance compared to the given transmit waveform such as at point A on curve 1002.

To validate the simultaneous savings in bandwidth and energy using waveform diversity, FIG. 13A and FIG. 13B show the actual SINR-Energy plots employing optimum waveform design (curve 1301) as well as a given chirp transmit signal (curve 1302). Both methods use a target transform Q(ω) as in FIG. 12A, and noise and clutter spectra $G_n(\omega)$ and $G_c(\omega)$ as in FIG. 12B and FIG. 12C, respectively. As described earlier the target and clutter has been modified using the transmitter output filter $P_1(\omega)$ in FIG. 11 so that at every stage the operating band $\Omega_+(B_i)$ coincides with the desired bandwidth $B_i$. This is illustrated in FIG. 12D for a typical bandwidth $B_i$. FIG. 13B shows an enlarged version for FIG. 13A with the features around the points of interest A, B, C, D, F and G magnified.

The given chirp waveform $F_o(\omega)$ operating at point A in FIG. 13 uses the energy-bandwidth pair $(E_o, B_o)=(8.88 \text{ dB}, 0.15)$ with output performance given by $\text{SINR}_o=6.15$ dB. All bandwidths here are expressed as a fraction of the maximum available bandwidth dictated by the sampling period. The operating point C using waveform diversity on the optimum $\text{SINR}_1$ curve 1301 with performance equal to $\text{SINR}_o$, uses the energy-bandwidth pair $(E_C, B_C)=(5.875 \text{ dB}, 0.1193)$ resulting in simultaneous savings in both transmit energy and bandwidth compared to the chirp transmit waveform. Notice that compared to the given chirp waveform, the bandwidth requirement for the optimum waveform $|F_1(\omega)|^2$ given by equation (36) with $B_o=B_C$ has been reduced from 0.15 to 0.1193, whereas the energy requirement has been reduced from 8.88 dB to 5.875 dB without sacrificing the performance.

The operating point F also corresponds to the same performance level as $\text{SINR}_o$, and it lies on curve 1304 that corresponds to $\text{SINR}_1(E, B_D)$ curve $Da_D$ with $B_D=0.065$. The performance $\text{SINR}_o$ is met here with energy $E_F=7.01$ dB. In other words, the optimum waveform $|F_2(\omega)|^2$ given by equation (42) with $E=E_F$ and $B_o=B_D$ gives the same performance $\text{SINR}_o$ as the given chirp transmit waveform, but uses less bandwidth and less energy. In this case, bandwidth requirement is reduced from 0.15 to 0.065, and the energy requirement is reduced from 8.88 dB to 7.01 dB. Notice that compared to the optimum waveform $|F_1(\omega)|^2$ at C, the waveform $|F_2(\omega)|^2$ at point F uses less bandwidth, but more energy. These waveform transform magnitude functions are plotted in FIG. 14B and FIG. 14C respectively along with the given transmit waveform transform magnitude $|F_o(\omega)|^2$ plotted in FIG. 14A.

Finally the curve 1305 that starts at G passes through A and the optimum waveform $|F_3(\omega)|^2$ given by equation (42) with $E=E_o$ and $B_o=B_G=0.0589$ also maintains the same performance $\text{SINR}_o$. Notice that $|F_4(\omega)|^2$ design plotted in FIG. 14D uses the least amount of bandwidth (about ⅓ bandwidth compared to the given chirp waveform) without the transmit energy exceeding the initial value $E_o$.

Thus, the design procedure illustrated in FIG. 10 and the results of actual computation in FIGS. 13-FIG. 14 using data from FIG. 11 and FIG. 12 show that simultaneous savings in bandwidth and energy are indeed possible using optimum waveform design compared to a given transmit waveform.

Finally to convert the optimum Fourier transform magnitude information in FIGS. 14A, B, C and D into a practically useful time domain signal, a suitable phase function $\psi_i(\omega)$ needs to be determined in each case. Let $A(\omega)$ represent the given Fourier transform magnitude $|F_i(\omega)|$ in FIGS. 14B, C and D, and together with the standard inverse Fourier transform operation $$f_i(t) \leftrightarrow |F_i(\omega)|e^{-j\psi_i(\omega)} \tag{72}$$

gives the desired time domain signal $f_i(t)$, i=1, 2, 3, 4. Here $\leftrightarrow$ represents the Fourier transform operation. The phase functions $\psi_i(\omega)$ are in general arbitrary in equation (72) and the freedom present in their selection can be used to "shape" the final time-domain signal $f_i(t)$ in equation (72) to be practically useful. One useful feature for time domain transmit signals is the constant envelope property that maximizes the transmit power efficiency. In that case, the final time domain waveform $f_i(t)$ will ideally have constant envelope or in practice approximately possess constant envelope thereby distributing the peak transmit power more evenly.

To achieve this goal, the method of alternating convex projections can be used such as described in D. C. Youla, "Mathematical Theory of image Restoration by the Method of Convex projections," Chapter 2, Theorem 2.4-1, in Image Recovery: Theory and Application edited by Henry Stark, pages 29-77, Academic press, Inc., New York, 1987. The desired signal $f_i(t)$ should maintain the band-limited property, as well as satisfy the given Fourier transform magnitude information $A(\omega)$ within the respective bandwidth as exhibited in FIG. 14. In addition, the desired signal also should maintain the constant envelope property in time domain. Although both the band-limited property and the constant envelope property do form convex sets, signals with the same Fourier transform magnitude do not form a convex set. Convex sets have the interesting property that starting with any given signal, projection operators associated with the convex sets determine a unique nearest neighbor to the given signal that is within the convex set. Although the magnitude substitution operation does not enjoy this unique nearest neighbor property, when iterated together with a projection operator it possesses an error reduction property at every stage, and the combined operator has been seen to converge in simulation studies, such as shown in A. Levi and H. Stark, "Image Restoration by the Method of Generalized Projections with Applications to Restoration from Magnitude," IEEE International Conference on Acoustics, Speech and Signal Processing, ICASSP'84, pages 88-91, March 1984 (See Theorem I on page 88 of Levi and Stark). To exploit these features, let $P_{B_o}$ represent the combined band-limiting operation onto the convex set $C_{B_o}$ that is band-limited to $(-B_o, B_o)$ as well as the magnitude substitution operation using the given Fourier transform magnitude $A(\omega)$ from FIG. 14. Similarly let $P_c$ represent the projection operator onto the convex set $C_c$ that is envelope limited to $\pm c$. Then for any arbitrary signal $$f(t) \leftrightarrow F(\omega)=|F(\omega)|e^{-j\psi(\omega)}, \tag{73}$$

the combined projection operator and the magnitude substitution operation $P_{B_o}$ is defined in terms of its transform as $$P_{B_o}(f(t)) \leftrightarrow \begin{cases} A(\omega)e^{-j\psi(\omega)}, & |\omega| \leq B_o \\ 0, & |\omega| > B_o \end{cases}, \tag{74}$$

where $A(\omega)$ represents the given Fourier transform magnitude within the desired bandwidth $(-B_o, B_o)$. Similarly $$P_c(f(t)) = \begin{cases} f(t), & |f(t)| \leq c \\ +c, & f(t) > c \\ -c, & f(t) < -c \end{cases} \tag{75}$$

represents the projection operator onto the constant envelope convex set, where c represents a suitable amplitude level to be determined that acts as the upper limit on the envelope. Starting with an arbitrary phase $\psi_o(\omega)$ and the given bandlimited magnitude transform $A(\omega)$, one may define $$f_o(t) \leftrightarrow F_o(\omega)=A(\omega)e^{-j\psi_o(\omega)} \tag{76}$$

as the initial signal. The method of alternating projection applies repeatedly the given projection operators in an alternating fashion and the combined iterate is known to converge weakly to a point in the intersection of the respective convex sets as shown in D. C. Youla and H. Webb, "Image Restoration by the Method of Convex Projections," IEEE Transactions on Medical imaging, Vol. MI-1, October 1982. Following that approach, in the present situation, the operator $P_{B_o}$ and the projection operator $P_c$ defined in equations (74)-(75) are applied to the initial signal $f_o(t)$ in an alternating fashion. In this case with $$P = P_c P_{B_o}, \quad (77)$$

representing the sequentially combined operator, we have $$f_{n+1}(t) = P_c P_{B_o} f_n(t) = P f_n(t), n = 0, 1, 2 \ldots \quad (78)$$

and the $n^{th}$ iteration $$f_n(t) = P^n f_o(t) \quad (79)$$

will have both the desired properties. As remarked earlier, in the case of purely projection operators, the iterate in equation (79) converges weakly to a point in the intersection set of the convex sets $C_{B_o}$ and $C_c$. In the present case although $P_c$ is a projection operator, $P_{B_o}$ is not a projection operator and hence the convergence of the iterate in equations (78)-(79) has been determined only experimentally. This conclusion is also supported by the error reduction property $$\|f_{n+1}(t) - P_{B_o} f_{n+1}(t)\| \leq \|f_n(t) - P_{B_o} f_n(t)\| \quad (80)$$

mentioned earlier. Finally, the constant amplitude level c in equation (75) can be determined by scaling the time domain waveform $f_{n+1}(t)$ so as to maintain its prescribed energy level. The number of iterations to be employed in equations (78)-(79) can be adjusted by stipulating the error function in equation (80) to be within an acceptable level.

FIG. 15A shows the original chirp waveform that is constant in magnitude to start with. FIGS. 15B, C and D show the time-domain signals obtained iteratively in the manner described above as in equations (76)-(80) starting with FIGS. 14B, 14C and 14D respectively. Notice that the waveforms in FIGS. 15B, 15C and 15D have approximately constant envelope, and uses smaller bandwidth and smaller energy levels compared to the original chirp signal, and they all perform at the same level.

In summary, the design procedure illustrated in FIG. 10 and the results of actual computation in FIG. 13-FIG. 15 using data from FIG. 11 and FIG. 12 show that simultaneous savings in bandwidth and energy are indeed possible using optimum waveform design compared to a given transmit waveform. The magnitude information so obtained can be trained to generate an almost constant envelope signal as in equations (78)-(80), and scaled properly to maintain the prescribed energy level in each case. FIG. 16 shows the computer processor 1610 that implements one or more methods in accordance with embodiments of the present invention described above by receiving at its input 1610a appropriate design parameters and outputting a desired transmit signal.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:
1. A method comprising
providing a transmitter and a receiver;
outputting a transmit signal $f_o(t)$ from the transmitter towards a target and towards interference;
wherein the target produces a target signal;
wherein the transmit signal $f_o(t)$ has a transmit signal bandwidth $B_o$, transmit signal energy, and a transmit signal waveform;
and further comprising receiving a combination signal at the receiver, wherein the combination signal includes noise and the transmit signal $f_o(t)$ modified by interacting with the target and the interference;
wherein the receiver has a filter having a transfer function of

$$H_o(\omega) = \frac{Q^*(\omega) F_o^*(\omega)}{G_c(\omega)|F_o(\omega)|^2 + G_n(\omega)} e^{-j\omega t_o}$$

and the filter acts on the combination signal to form a receiver output signal having a receiver output signal waveform;
wherein $F_o(\omega)$ represents the Fourier transform of the transmit signal $f_o(t)$;
wherein
$Q(\omega)$ is the target signal Fourier transform;
$G_c(\omega)$ is the interference spectrum; and
$G_n(\omega)$ is the noise spectrum;
wherein the receiver output signal has a receiver output signal waveform that describes an output signal to interference to noise ratio (SINR) performance; and
reducing both the transmit signal bandwidth and transmit signal energy simultaneously by modifying the transmit signal waveform and receiver output signal waveforms without sacrificing the output SINR performance level.

2. The method of claim 1 further comprising
selecting an initial desired bandwidth $B_o$ for the transmit signal bandwidth and determining the required energy $E_o$ for the transmit signal according to $$E_o = \frac{1}{2\pi} \int_{-B_0}^{B_0} \sqrt{G_n(\omega)} \left( \lambda_o - \frac{\sqrt{G_n(\omega)}}{Q(\omega)} \right) \frac{|Q(\omega)|}{G_c(\omega)} d\omega$$

wherein $$\lambda_o = \max_{\omega \in B_o} \frac{\sqrt{G_n(\omega)}}{|Q(\omega)|},$$

and scaling the transmit signal so that its energy is made equal to $E_o$ above; and determining the performance for the transmit signal $F_o(\omega)$ with transmit energy $E_o$ and bandwidth $B_o$, receiver signal $H_o(\omega)$ above is given by $$SINR_o = \frac{1}{2\pi} \int_{-B_o}^{B_o} \frac{|Q(\omega)|^2 |F_o(\omega)|^2}{G_c(\omega)|F_o(\omega)|^2 + G_n(\omega)} d\omega.$$

wherein
$Q(\omega)$ is the target signal Fourier transform;
$G_c(\omega)$ is the interference spectrum; and
$G_n(\omega)$ is the noise spectrum.

3. The method of claim 1 further comprising
selecting a second bandwidth $B_C$ smaller than the given bandwidth $B_o$ so as to satisfy the condition $$SINR_1(E_c, B_c) = a_c - \frac{c_c^2}{E_c + b_c} = SINR_o,$$

where the second energy level $E_c$ smaller than the energy $E_o$ is given by $$E_c = \frac{1}{2\pi} \int_{-B_C}^{B_C} \sqrt{G_n(\omega)} \left( \lambda_c - \frac{\sqrt{G_n(\omega)}}{Q(\omega)} \right) \frac{|Q(\omega)|}{G_c(\omega)} d\omega$$

with $$\lambda_c = \max_{\omega \in B_C} \frac{\sqrt{G_n(\omega)}}{|Q(\omega)|},$$

and $$a_c = \frac{1}{2\pi} \int_{\Omega_+(B_C)} \frac{|Q(\omega)|^2}{G_c(\omega)} d\omega,$$

$$b_c = \frac{1}{2\pi} \int_{\Omega_+(B_C)} \frac{G_n(\omega)}{G_c(\omega)} d\omega,$$

and $$c_c = \frac{1}{2\pi} \int_{\Omega_+(B_C)} \frac{\sqrt{G_n(\omega)} |Q(\omega)|}{G_c(\omega)} d\omega,$$

where $\Omega_+(B_C)$ represents the frequency band ($-B_C \leq \omega \leq B_C$).

4. The method of claim 3 further comprising selecting a third bandwidth $B_D$ smaller than the second bandwidth $B_C$ and solving for a third energy $E_F$ so as to satisfy the condition $$SINR_1(E_F, B_D) = a_D - \frac{c_D^2}{E_F + b_D} = SINR_o,$$

and $$a_D = \frac{1}{2\pi} \int_{\Omega_+(B_D)} \frac{|Q(\omega)|^2}{G_c(\omega)} d\omega,$$

$$b_D = \frac{1}{2\pi} \int_{\Omega_+(B_D)} \frac{G_n(\omega)}{G_c(\omega)} d\omega,$$

and $$c_D = \frac{1}{2\pi} \int_{\Omega_+(B_D)} \frac{\sqrt{G_n(\omega)} |Q(\omega)|}{G_c(\omega)} d\omega,$$

where $\Omega_+(B_D)$ represents the frequency band ($-B_D \leq \omega \leq B_D$).

5. The method of claim 4 further comprising
constructing a third transmit signal having a third transmit signal waveform;
wherein the third transmit signal is different from the first and second transmit signals and the third transmit signal waveform is different from the first and second transmit signal waveforms;
wherein the third transmit signal has a prescribed bandwidth which is $B_D$ that is smaller than the second transmit signal bandwidth $B_C$;
wherein the third transmit signal has an energy which is $E_F$ that is greater than the second transmit signal energy $E_C$, but smaller than the first transmit signal energy $E_o$;
wherein the third transmit signal has Fourier transform $F_2(\omega)$ whose magnitude function is given by $$|F_2(\omega)|^2 = \begin{cases} \dfrac{\sqrt{G_n(\omega)} \left( \lambda(E_F)|Q(\omega)| - \sqrt{G_n(\omega)} \right)}{G_c(\omega)}, & \omega \in \Omega_+(B_D) \\ 0, & \text{otherwise} \end{cases}$$

wherein $$\lambda(E_F) = \frac{E_F + \dfrac{1}{2\pi} \int_{\Omega_+(B_D)} \dfrac{G_n(\omega)}{G_c(\omega)} d\omega}{\dfrac{1}{2\pi} \int_{\Omega_+(B_D)} \dfrac{\sqrt{G_n(\omega)} |Q(\omega)|}{G_c(\omega)} d\omega}.$$

and wherein the third, second and first transmit signals have the same performance index $SINR_o$ in terms of target detection in interference and noise, when the third signal is used in conjunction with a receiver filter that has a Fourier transform $H_{opt}(\omega)$ given by $$H_{opt}(\omega) = \frac{Q^*(\omega) F_2^*(\omega)}{G_c(\omega)|F_2(\omega)|^2 + G_n(\omega)} e^{-j\omega t_o}$$

wherein $t_o$ is a decision instant at which the target signal is to be detected.

6. The method of claim 5 further comprising
generating a time domain signal that is constant envelope substantially everywhere while maintaining the given third transform magnitude $|F_2(\omega)|$ by starting with any suitable signal $f_o(t)$ and iteratively computing $$f_{n+1}(t) = P_c \{ P_{B_D}(f_n(t)) \}, n=0,1,2 \ldots$$

wherein $$P_{B_D}(f_n(t)) \leftrightarrow \begin{cases} |F_2(\omega)| e^{-j\psi_n(\omega)}, & |\omega| \leq B_D \\ 0, & |\omega| > B_D \end{cases},$$

with $\leftrightarrow$ representing the standard Fourier transform operation, $\psi_n(\omega)$ the phase function of the Fourier transform of $f_n(t)$, and $$P_c\{f(t)\} = \begin{cases} f(t), & |f(t)| \leq c \\ +c, & f(t) > c \\ -c, & f(t) < -c \end{cases},$$

and determining the constant envelope level c above by normalizing the final iterated signal $f_{n+1}(t)$ to maintain the prescribed energy level $E_F$
wherein normalizing the final iterated signal $F_{n+1}(t)$ gives the third transmit signal waveform
and wherein the third transmit signal waveform maintain constant envelope substantially everywhere.

7. The method of claim 3 further comprising
selecting a fourth bandwidth $B_G$ smaller than the third bandwidth $B_D$ so as to satisfy the condition $$SINR_1(E_o, B_G) = a_G - \frac{c_G^2}{E_o + b_G} = SINR_o,$$

where $E_o$ corresponds to the prescribed energy, and $$a_G = \frac{1}{2\pi} \int_{\Omega_+(B_G)} \frac{|Q(\omega)|^2}{G_c(\omega)} d\omega,$$

$$b_G = \frac{1}{2\pi} \int_{\Omega_+(B_G)} \frac{G_n(\omega)}{G_c(\omega)} d\omega,$$

and $$c_G = \frac{1}{2\pi} \int_{\Omega_+(B_G)} \frac{\sqrt{G_n(\omega)}|Q(\omega)|}{G_c(\omega)} d\omega,$$

where $\Omega_+(B_G)$ represents the frequency band $(-B_G \leq \omega \leq B_G)$.

8. The method of claim 7 further comprising
constructing a fourth transmit signal having a fourth transmit signal waveform;
wherein the fourth transmit signal is different from the first, second and third transmit signals and the fourth transmit signal waveform is different from the first, second and third transmit signal waveforms;
wherein the fourth transmit signal has a bandwidth which is $B_G$ that is smaller than the third transmit signal bandwidth $B_D$;
wherein the fourth transmit signal has energy $E_o$ that is the same as the first transmit signal energy;
wherein the fourth transmit signal has transform $F_3(\omega)$ whose magnitude function is given by $$|F_3(\omega)|^2 = \begin{cases} \frac{\sqrt{G_n(\omega)}\left(\lambda(E_o)|Q(\omega)| - \sqrt{G_n(\omega)}\right)}{G_c(\omega)}, & \omega \in \Omega_+(B_G) \\ 0, & \text{otherwise} \end{cases}$$

wherein $$\lambda(E_o) = \frac{E_o + \frac{1}{2\pi} \int_{\Omega_+(B_G)} \frac{G_n(\omega)}{G_c(\omega)} d\omega}{\frac{1}{2\pi} \int_{\Omega_+(B_G)} \frac{\sqrt{G_n(\omega)}|Q(\omega)|}{G_c(\omega)} d\omega}.$$

and wherein the fourth, third, second and first transmit signals have the same performance index $SINR_o$ in terms of target detection in interference and noise, when used in conjunction with a receiver filter for the receiver such that the receiver filter has a Fourier transform $H_{opt}(\omega)$ given by $$H_{opt}(\omega) = \frac{Q^*(\omega) F_3^*(\omega)}{G_c(\omega)|F_3(\omega)|^2 + G_n(\omega)} e^{-j\omega t_o}$$

wherein $t_o$ is a decision instant at which the target signal is to be detected.

9. The method of claim 8 further comprising
generating a time domain signal that is constant envelope substantially everywhere while maintaining the given fourth transform magnitude $|F_3(\omega)|$ by starting with any suitable signal $f_o(t)$ and iteratively computing $$f_{n+1}(t) = P_c\{P_{B_G}(f_n(t))\}, n=0,1,2 \ldots$$

wherein $$P_{B_G}(f_n(t)) \leftrightarrow \begin{cases} |F_3(\omega)| e^{-j\psi_n(\omega)}, & |\omega| \leq B_G \\ 0, & |\omega| > B_G \end{cases},$$

with $\leftrightarrow$ representing the standard Fourier transform operation, $\psi_n(\omega)$ the phase function of the Fourier transform of $f_n(t)$, and $$P_c\{f(t)\} = \begin{cases} f(t), & |f(t)| \leq c \\ +c, & f(t) > c \\ -c, & f(t) < -c \end{cases},$$

and determining the constant envelope level c above by normalizing the final iterated signal $f_{n+1}(t)$ to maintain the prescribed energy level $E_o$ wherein normalizing the final iterated signal $F_{n+1}(t)$ gives the fourth transmit signal waveform; and wherein the fourth transmit signal waveform maintains constant envelope substantially everywhere.

10. A method comprising
constructing a first transmit signal having a first transmit signal waveform;
constructing a second transmit signal having a second transmit signal waveform;
wherein the first transmit signal is different from the second transmit signal and the first transmit signal waveform is different from the second transmit signal waveform;
wherein the first transmit signal has a prescribed bandwidth which is $B_o$;
wherein the first transmit signal has a prescribed energy which is $E_o$;
wherein the second transmit signal has a smaller bandwidth which is $B_C$;
wherein the second transmit signal has a smaller energy level which is $E_c$;
wherein the first transmit signal has a transform $F_o(\omega)$ which is user given;
wherein the second transmit signal has a transform $F_1(\omega)$ whose magnitude function is given by $$|F_1(\omega)|^2 =$$
$$\begin{cases} \sqrt{G_n(\omega)}\left(\left(\max_{\omega \in B_C} \frac{\sqrt{G_n(\omega)}}{|Q(\omega)|}\right) - \frac{\sqrt{G_n(\omega)}}{|Q(\omega)|}\right) \frac{|Q(\omega)|}{G_c(\omega)}, & -B_c \leq \omega \leq B_c \\ 0, & \text{otherwise} \end{cases};$$

and wherein the first and second transmit signals have the same performance index $SINR_o$ given by $$SINR_o = \frac{1}{2\pi} \int_{-B_o}^{B_o} \frac{|Q(\omega)|^2 |F_o(\omega)|^2}{G_c(\omega)|F_o(\omega)|^2 + G_n(\omega)} d\omega$$

in terms of target detection in interference and noise, when used in conjunction with a receiver filter for a receiver such that the receiver filter has a Fourier transform $H_{opt}(\omega)$ given by $$H_{opt}(\omega) = \frac{Q^*(\omega)F^*(\omega)}{G_c(\omega)|F(\omega)|^2 + G_n(\omega)} e^{-j\omega t_o}$$

wherein
$Q(\omega)$ is the target signal Fourier transform;
$G_c(\omega)$ is the interference spectrum; and
$G_n(\omega)$ is the noise spectrum and
wherein $t_o$ is a decision instant at which the target signal is to be detected, and these two waveforms $F_o(\omega)$ and $F_1(\omega)$ substituted for $F(\omega)$ above accordingly; and further comprising outputting the first transmit signal from a transmitter and towards a target;
outputting the second transmit signal from the transmitter and towards the target;
receiving one or morn received signals at a receiver as a result of the outputting of the first transmit signal and the outputting of the second transmit signal.

11. The method of claim 10 further comprising
generating a time domain signal that is constant envelope substantially everywhere while maintaining the given second transform magnitude $|F_1(\omega)|$, by starting with any signal $f_o(t)$ and iteratively computing $$f_{n+1}(t) = P_c\{P_{B_c}(f_n(t))\}, n=0,1,2\ldots$$

where $$P_{B_c}(f_n(t)) \leftrightarrow \begin{cases} |F_1(\omega)|e^{-j\psi_n(\omega)}, & |\omega| \leq B_c \\ 0, & |\omega| > B_c \end{cases},$$

with $\leftrightarrow$ representing the standard Fourier transform operation, $\psi_n(\omega)$ the phase function of the Fourier transform of $f_n(t)$, and $$P_c\{f(t)\} = \begin{cases} f(t), & |f(t)| \leq c \\ +c, & f(t) > c \\ -c, & f(t) < -c \end{cases}$$

and determining the constant envelope level c above by normalizing the final iterated signal $f_{n+1}(t)$ to maintain the prescribed energy level $E_c$ and
wherein normalizing the final iterated signal $f_{n+1}(t)$ gives the second transmit signal waveform wherein the second transmit signal waveform maintains constant envelope substantially everywhere.

12. An apparatus comprising
a transmitter;
a receiver; and
a computer processor;
wherein the transmitter is configured to output a transmit signal $f_o(t)$ from the transmitter towards a target and towards interference;
wherein the target produces a target signal;
wherein the transmit signal $f_o(t)$ has a transmit signal bandwidth $B_o$, transmit signal energy, and a transmit signal waveform;
and wherein the receiver is configured to receive a combination signal at the receiver, wherein the combination signal includes noise and the transmit signal $f_o(t)$ modified by interacting with the target and the interference;

wherein the receiver has a filter having a transfer function of $$H_o(\omega) = \frac{Q^*(\omega)F_o^*(\omega)}{G_c(\omega)|F_o(\omega)|^2 + G_n(\omega)} e^{-j\omega t_o}$$

and the filter acts on the combination signal to form a receiver output signal having a receiver output signal waveform;
wherein $F_o(\omega)$ represents the Fourier transform of the transmit signal $f_o(t)$; wherein
$Q(\omega)$ is the target signal Fourier transform;
$G_c(\omega)$ is the interference spectrum; and
$G_n(\omega)$ is the noise spectrum;
wherein the receiver output signal has a receiver output signal waveform that describes an output signal to interference to noise ratio (SINR) performance; and
wherein the computer processor is programmed to reduce both the transmit signal bandwidth and transmit signal energy simultaneously by causing the transmit signal waveform and the receiver output signal waveform to be modified without sacrificing the output SINR performance level.

13. The apparatus of claim 12 wherein
the computer processor programmed to select an initial desired bandwidth $B_o$ for the transmit signal bandwidth and the computer processor is programmed to determine the required energy $E_o$ for the transmit signal according to $$E_o = \frac{1}{2\pi} \int_{-B_0}^{B_0} \sqrt{G_n(\omega)} \left(\lambda_o - \frac{\sqrt{G_n(\omega)}}{Q(\omega)}\right) \frac{|Q(\omega)|}{G_c(\omega)} d\omega$$

wherein $$\lambda_o = \max_{\omega \in B_o} \frac{\sqrt{G_n(\omega)}}{|Q(\omega)|},$$

and the computer processor is programmed to scale the transmit signal so that its energy is made equal to $E_o$ above;
and wherein the computer processor is programmed to determine the performance for the transmit signal $F_o(\omega)$ with transmit energy $E_o$ and bandwidth $B_o$, receiver signal $H_o(\omega)$ above given by $$SINR_o = \frac{1}{2\pi} \int_{-B_o}^{B_o} \frac{|Q(\omega)|^2 |F_o(\omega)|^2}{G_c(\omega)|F_o(\omega)|^2 + G_n(\omega)} d\omega.$$

wherein
$Q(\omega)$ is the target signal Fourier transform;
$G_c(\omega)$ is the interference spectrum; and
$G_n(\omega)$ is the noise spectrum.

14. The apparatus of claim 12 wherein
the computer processor is programmed to select a second bandwidth $B_C$ smaller than the given bandwidth $B_o$ so as to satisfy the condition $$SINR_1(E_c, B_c) = a_c - \frac{c_c^2}{E_c + b_c} = SINR_o,$$

where the second energy level $E_c$ smaller than the energy $E_o$ is given by $$E_c = \frac{1}{2\pi} \int_{-B_c}^{B_c} \sqrt{G_n(\omega)} \left( \lambda_c - \frac{\sqrt{G_n(\omega)}}{Q(\omega)} \right) \frac{|Q(\omega)|}{G_c(\omega)} d\omega$$

with $$\lambda_c = \max_{\omega \in B_c} \frac{\sqrt{G_n(\omega)}}{|Q(\omega)|},$$

and $$a_c = \frac{1}{2\pi} \int_{\Omega_+(B_c)} \frac{|Q(\omega)|^2}{G_c(\omega)} d\omega,$$

$$b_c = \frac{1}{2\pi} \int_{\Omega_+(B_c)} \frac{G_n(\omega)}{G_c(\omega)} d\omega,$$

and $$c_c = \frac{1}{2\pi} \int_{\Omega_+(B_c)} \frac{\sqrt{G_n(\omega)} |Q(\omega)|}{G_c(\omega)} d\omega,$$

where $\Omega_+(B_c)$ represents the frequency band $(-B_c \leq \omega \leq B_c)$.

15. The apparatus of claim 14 further comprising
wherein the computer processor is programmed to select a third bandwidth $B_D$ smaller than the second bandwidth $B_C$ and solving for a third energy $E_F$ so as to satisfy the condition $$SINR_1(E_F, B_D) = a_D - \frac{c_D^2}{E_F + b_D} = SINR_o,$$

and $$a_D = \frac{1}{2\pi} \int_{\Omega_+(B_D)} \frac{|Q(\omega)|^2}{G_c(\omega)} d\omega,$$

$$b_D = \frac{1}{2\pi} \int_{\Omega_+(B_D)} \frac{G_n(\omega)}{G_c(\omega)} d\omega,$$

and $$c_D = \frac{1}{2\pi} \int_{\Omega_+(B_D)} \frac{\sqrt{G_n(\omega)} |Q(\omega)|}{G_c(\omega)} d\omega,$$

where $\Omega_+(B_D)$ represents the frequency band $(-B_D \leq \omega \leq B_D)$.

16. An apparatus comprising
a transmitter;
a receiver; and
a computer processor;
wherein the computer processor is programmed to cause the transmitter to output a first transmit signal having a first transmit signal waveform;
wherein the computer processor is programmed to cause the transmitter to output a second transmit signal having a second transmit signal waveform;
wherein the first transmit signal is different from the second transmit signal and the first transmit signal waveform is different from the second transmit signal waveform;
wherein the first transmit signal has a prescribed bandwidth which is $B_o$;
wherein the first transmit signal has a prescribed energy which is $E_o$;
wherein the second transmit signal has a smaller bandwidth which is $B_C$;

wherein the second transmit signal has a smaller energy level which is $E_c$;
wherein the first transmit signal has a transform $F_o(\omega)$ which is determined by a user input into the computer processor;
wherein the second transmit signal has transform $F_1(\omega)$ whose magnitude function is given by $$|F_1(\omega)|^2 = \begin{cases} \sqrt{G_n(\omega)} \left( \left( \max_{\omega \in B_c} \frac{\sqrt{G_n(\omega)}}{|Q(\omega)|} \right) - \frac{\sqrt{G_n(\omega)}}{|Q(\omega)|} \right) \frac{|Q(\omega)|}{G_c(\omega)}, & -B_c \leq \omega \leq B_c \\ 0, & \text{otherwise} \end{cases} ;$$

and wherein the first and second transmit signals have the same performance index $SINR_o$ given by $$SINR_o = \frac{1}{2\pi} \int_{-B_o}^{B_o} \frac{|Q(\omega)|^2 |F_o(\omega)|^2}{G_c(\omega)|F_o(\omega)|^2 + G_n(\omega)} d\omega$$

in terms of target detection in interference and noise, when used in conjunction with a receiver filter for the receiver such that the receiver filter has a Fourier transform $H_{opt}(\omega)$ given by $$H_{opt}(\omega) = \frac{Q^*(\omega) F^*(\omega)}{G_c(\omega)|F(\omega)|^2 + G_n(\omega)} e^{-j\omega t_o}$$

wherein $t_o$ is a decision instant at which the target signal is to be detected, and either $F_1(\omega)$ or $F_o(\omega)$ are substituted for $F(\omega)$ above accordingly.

17. The apparatus of claim 16 wherein
the computer processor is programmed to cause the transmitter to generate a time domain signal that is constant envelope substantially everywhere while maintaining the transform magnitude $|F_1(\omega)|$ by starting with a signal $f_o(t)$ that has energy $E_o$ and bandwidth $B_o$ and the computer processor is programmed to iteratively compute $$f_{n+1}(t) = P_c\{P_{B_c}(f_n(t))\}, n=0,1,2 \ldots$$

where $$P_{B_c}(f_n, (t)) \leftrightarrow \begin{cases} |F_1(\omega)| e^{-j\psi_n(\omega)}, & |\omega| \leq B_c \\ 0, & |\omega| > B_c \end{cases},$$

with $\leftrightarrow$ representing the standard Fourier transform operation, $\psi_n(\omega)$ the phase function of the Fourier transform of $f_n(t)$, and $$P_c\{f(t)\} = \begin{cases} f(t) & |f(t)| \leq c \\ +c, & f(t) > c \\ -c, & f(t) < -c \end{cases},$$

and wherein the computer processor is programmed to determine the constant envelope level c above by normalizing the final iterated signal $f_{n+1}(t)$ to maintain the prescribed energy level $E_c$; and wherein the normalized iterate $f_{n+1}(t)$ gives the second transmit signal waveform, and wherein the second transmit signal waveform maintains constant envelope substantially everywhere.

18. The apparatus of claim 16 wherein the computer processor is programmed to cause the transmitter to output a third transmit signal having a third transmit signal waveform;

wherein the third transmit signal is different from the first and second transmit signals and the third transmit signal waveform is different from the first and second transmit signal waveforms;

wherein the third transmit signal has a prescribed bandwidth which is $B_D$ that is smaller than the second transmit signal bandwidth $B_C$;

wherein the third transmit signal has an energy which is $E_F$ that is greater than the second transmit signal energy $E_C$, but smaller than the first transmit signal energy $E_o$;

wherein the third transmit signal has a Fourier transform $F_2(\omega)$ whose magnitude function is given by $$|F_2(\omega)|^2 = \begin{cases} \dfrac{\sqrt{G_n(\omega)}\left(\lambda(E_F)|Q(\omega)| - \sqrt{G_n(\omega)}\right)}{G_c(\omega)}, & \omega \in \Omega_+(B_D) \\ 0, & \text{otherwise} \end{cases}$$

wherein $$\lambda(E_F) = \dfrac{E_F + \dfrac{1}{2\pi}\displaystyle\int_{\Omega_+(B_D)} \dfrac{G_n(\omega)}{G_c(\omega)} d\omega}{\dfrac{1}{2\pi}\displaystyle\int_{\Omega_+(B_D)} \dfrac{\sqrt{G_n(\omega)}|Q(\omega)|}{G_c(\omega)} d\omega}.$$

and wherein the third, second and first transmit signals have the same performance index $SINR_o$ in terms of target detection in interference and noise, when the third signal is used in conjunction with a receiver filter that has a Fourier transform $H_{opt}(\omega)$ given by $$H_{opt}(\omega) = \dfrac{Q^*(\omega) F_2^*(\omega)}{G_c(\omega)|F_2(\omega)|^2 + G_n(\omega)} e^{-j\omega t_o}$$

wherein $t_o$ is a decision instant at which the target signal is to be detected.

19. The apparatus of claim 18 wherein the computer processor is programmed to cause the transmitter to generate a time domain signal that is substantially constant envelope while maintaining the third transform magnitude $|F_2(\omega)|$ by starting with a signal $f_o(t)$ that has the required energy and bandwidth and the computer processor is programmed to iteratively compute $$f_{n+1}(t) = P_c\{P_{B_D}(f_n((t))\}, n=0,1,2\ldots$$

wherein $$P_{B_D}(f_n(t)) \leftrightarrow \begin{cases} |F_2(\omega)|e^{-j\psi_n(\omega)}, & |\omega| \leq B_D \\ 0, & |\omega| > B_D \end{cases},$$

with $\leftrightarrow$ representing the standard Fourier transform operation, $\psi_n(\omega)$ the phase function of the Fourier transform of $f_n(t)$, and $$P_c\{f(t)\} = \begin{cases} f(t), & |f(t)| \leq c \\ +c, & f(t) > c \\ -c, & f(t) < -c \end{cases},$$

and wherein the computer processor determines the constant envelope level c above by normalizing the final iterated signal $f_{n+1}(t)$ to maintain the prescribed energy level $E_F$;

wherein the normalized iterate signal $f_{n+1}(t)$ gives the third transmit signal waveform and wherein the third transmit signal waveform maintains substantially constant envelope.

20. The apparatus of claim 18 wherein the computer processor is programmed to select a fourth bandwidth $B_G$ smaller than the third bandwidth $B_D$ so as to satisfy the condition $$SINR_1(E_o, B_G) = a_G - \dfrac{c_G^2}{E_o + b_G} = SINR_o,$$

where $E_o$ corresponds to the prescribed energy, and $$a_G = \dfrac{1}{2\pi}\int_{\Omega_+(B_G)} \dfrac{|Q(\omega)|^2}{G_c(\omega)} d\omega,$$

$$b_G = \dfrac{1}{2\pi}\int_{\Omega_+(B_G)} \dfrac{G_n(\omega)}{G_c(\omega)} d\omega,$$

and $$c_G = \dfrac{1}{2\pi}\int_{\Omega_+(B_G)} \dfrac{\sqrt{G_n(\omega)}|Q(\omega)|}{G_c(\omega)} d\omega,$$

where $\Omega_+(B_G)$ represents the frequency band $(-B_G \leq \omega \leq B_G)$.

21. The apparatus of claim 20 wherein the computer processor is programmed to cause the transmitter to construct a fourth transmit signal having a fourth transmit signal waveform;

wherein the fourth transmit signal is different from the first, second and third transmit signals and the fourth transmit signal waveform is different from the first, second and third transmit signal waveforms;

wherein the fourth transmit signal has a bandwidth which is $B_G$ that is smaller than the third transmit signal bandwidth $B_D$;

wherein the fourth transmit signal has energy $E_o$ that is the same as the first transmit signal energy;

wherein the fourth transmit signal has transform $F_3(\omega)$ whose magnitude function is given by $$|F_3(\omega)|^2 = \begin{cases} \dfrac{\sqrt{G_n(\omega)}\left(\lambda(E_o)|Q(\omega)| - \sqrt{G_n(\omega)}\right)}{G_c(\omega)}, & \omega \in \Omega_+(B_G) \\ 0, & \text{otherwise} \end{cases}$$

wherein $$\lambda(E_o) = \frac{E_o + \frac{1}{2\pi}\int_{\Omega_+(B_G)} \frac{G_n(\omega)}{G_c(\omega)} d\omega}{\frac{1}{2\pi}\int_{\Omega_+(B_G)} \frac{\sqrt{G_n(\omega)}|Q(\omega)|}{G_c(\omega)} d\omega}.$$

and wherein the fourth, third, second and first transmit signals have the same performance index $SINR_o$ in terms of target detection in interference and noise, when used in conjunction with the receiver filter for the receiver such that the receiver filter has a Fourier transform $H_{opt}(\omega)$ given by $$H_{opt}(\omega) = \frac{Q*(\omega)F_3*(\omega)}{G_c(\omega)|F_3(\omega)|^2 + G_n(\omega)} e^{-j\omega t_o}$$

wherein $t_o$ is a decision instant at which the target signal is to be detected.

22. The apparatus of claim 21 wherein the computer processor is programmed to generate a time domain signal that is substantially constant envelope while maintaining the given fourth transform magnitude $|F_3(\omega)|$ by starting with any suitable signal $f_o(t)$ and iteratively computing $$f_{n+1}(t) = P_c\{P_{B_G}(f_n(t))\}, n=0,1,2\ldots$$

wherein $$P_{B_G}(f_n(t)) \leftrightarrow \begin{cases} |F_3(\omega)|e^{-j\psi_n(\omega)}, & |\omega| \leq B_G \\ 0, & |\omega| > B_G \end{cases},$$

with $\leftrightarrow$ representing the standard Fourier transform operation, $\psi_n(\omega)$ the phase function of the Fourier transform of $f_n(t)$, and $$P_c\{f(t)\} = \begin{cases} f(t), & |f(t)| \leq c \\ +c, & f(t) > c \\ -c, & f(t) < -c \end{cases},$$

and determining the constant envelope level c above by normalizing the final iterated signal $f_{n+1}(t)$ to maintain the prescribed energy level $E_o$. The normalized iterate $f_{n+1}(t)$ gives the desired fourth transmit signal waveform that maintains substantially constant envelope.

* * * * *